(12) United States Patent
Mishra et al.

(10) Patent No.: US 12,429,927 B2
(45) Date of Patent: Sep. 30, 2025

(54) CAMERA COVER WITH MULTIPLE INTEGRATED LENSES

(71) Applicant: Intel Corporation, Santa Clara, CA (US)

(72) Inventors: Surya Pratap Mishra, Portland, OR (US); Mark Edmund Sprenger, Tigard, OR (US); James M. Yoder, Beaverton, OR (US); Prosenjit Ghosh, Portland, OR (US); Jordan E. Maslov, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 115 days.

(21) Appl. No.: 18/189,894

(22) Filed: Mar. 24, 2023

(65) Prior Publication Data

US 2024/0319772 A1     Sep. 26, 2024

(51) Int. Cl.
*G06F 1/16*     (2006.01)
*G03B 17/12*     (2021.01)
*H04N 23/51*     (2023.01)
*H04N 23/55*     (2023.01)

(52) U.S. Cl.
CPC .......... *G06F 1/1686* (2013.01); *G03B 17/12* (2013.01); *H04N 23/51* (2023.01); *H04N 23/55* (2023.01)

(58) Field of Classification Search
CPC ...... G06F 1/1686; G03B 17/12; H04N 23/51; H04N 23/55
See application file for complete search history.

(56) References Cited

U.S. PATENT DOCUMENTS

| | | | |
|---|---|---|---|
| 8,639,106 B1* | 1/2014 | Gleason | G03B 17/14 396/529 |
| 9,294,660 B2* | 3/2016 | O'Neill | H04M 1/026 |
| 2003/0164895 A1* | 9/2003 | Viinikanoja | H04M 1/0264 348/340 |
| 2010/0102979 A1* | 4/2010 | Huang | G06F 1/1616 361/679.57 |
| 2013/0177304 A1* | 7/2013 | Chapman | G03B 17/565 396/533 |
| 2014/0078594 A1* | 3/2014 | Springer | G02B 7/16 359/821 |
| 2015/0009399 A1* | 1/2015 | Jonsson | G03B 11/041 348/373 |
| 2016/0006934 A1* | 1/2016 | Eromaki | H04M 1/0264 348/360 |
| 2018/0176349 A1* | 6/2018 | Aberle | G02B 13/001 |
| 2022/0334618 A1 | 10/2022 | Magi et al. | |

(Continued)

OTHER PUBLICATIONS

Oxford English Dictionary definition of "coupled", retrieved from https://www.oed.com/dictionary/coupled_adj?tab=meaning_and_use#8117664 on Jan. 29, 2025 (Year: 2025).*

(Continued)

*Primary Examiner* — Timothy J Henn
(74) *Attorney, Agent, or Firm* — Alliance IP, LLC

(57) ABSTRACT

In one embodiment, an apparatus includes a camera sensor within a housing and a camera cover comprising a plurality of lenses coupled to the housing. The camera cover is moveably coupled to the housing to allow each respective lens of the plurality of lenses to be optically aligned with the camera sensor.

16 Claims, 18 Drawing Sheets

(56) References Cited

U.S. PATENT DOCUMENTS

2024/0040218 A1\* 2/2024 Birnbaum .......... H02K 41/0356

OTHER PUBLICATIONS

Oxford English Dictionary definition of "movably", retrieved from https://www.oed.com/dictionary/movably_adv?tab=meaning_and_use#35808563 on Jan. 29, 2025 (Year: 2025).\*
Soni, Jitendra, "Laptops with multi-cameras might appear as early as next year," techradar; Oct. 1, 2020; accessed Mar. 29, 2023; https://www.techradar.com/news/laptops-with-multi-cameras-might-appear-as-early-as-next-year; 7 pages.

\* cited by examiner

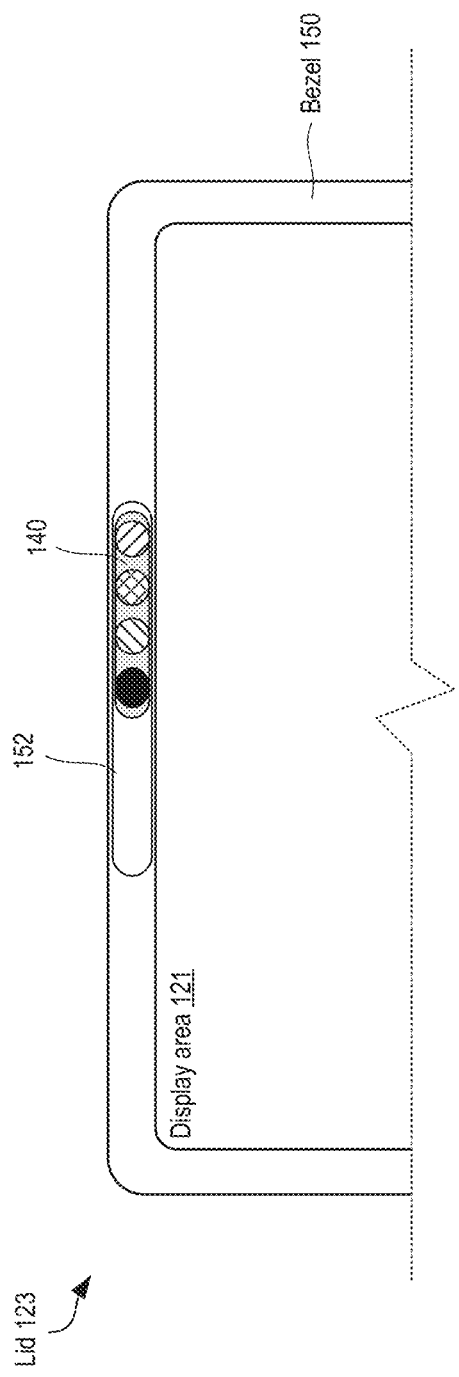
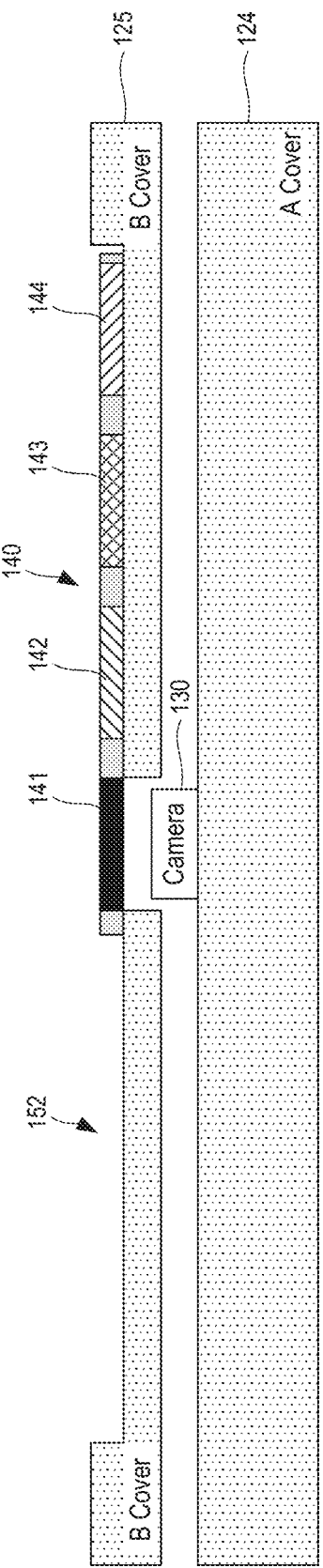
FIG. 2A
FIG. 2B

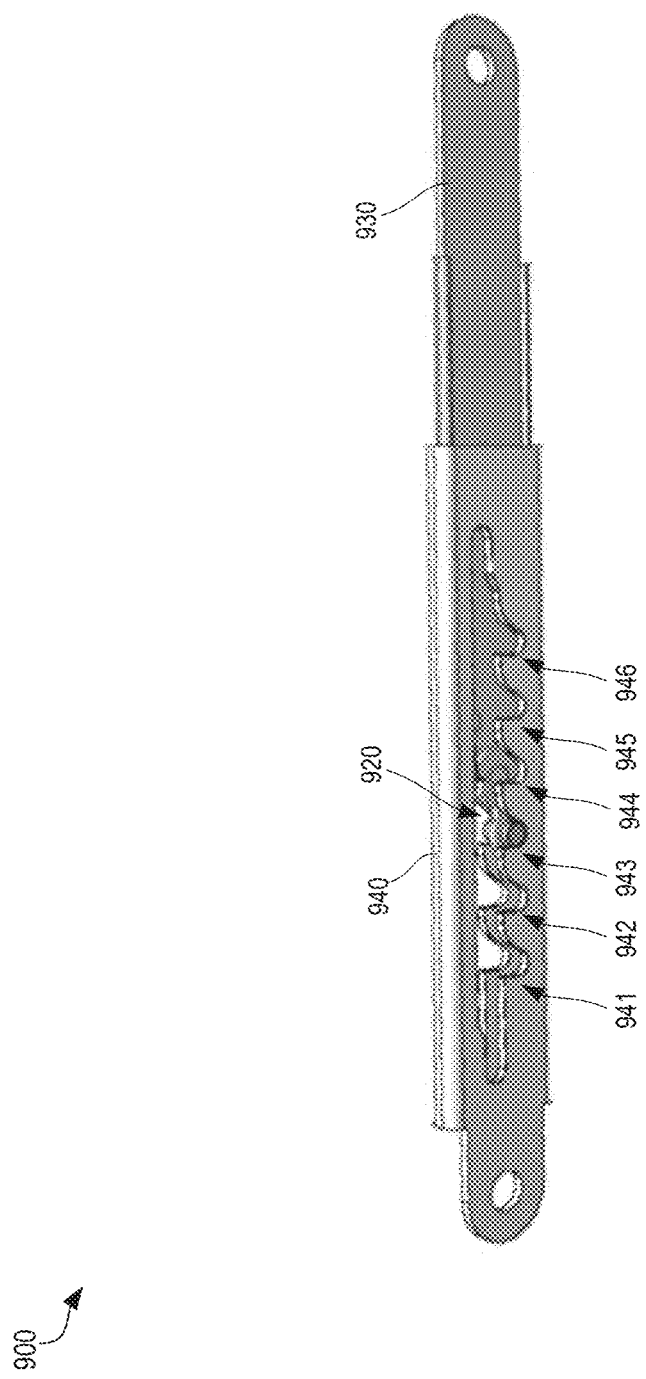

CAMERA COVER WITH MULTIPLE INTEGRATED LENSES

BACKGROUND

Mobile computing devices, such as laptop computers, tablets, mobile phones, etc., have been increasingly used for video conferencing. These devices typically have a user-facing camera. However, the camera hardware typically has a single lens stack, with fixed lens characteristics, e.g., field of view (FOV), focal length, aperture size, etc. This can lead to user experience issues, such as limitations on the number of people that can fit into a frame, non-optimal views of a single user, image quality in low light conditions, or other undesired image characteristics.

BRIEF DESCRIPTION OF THE DRAWINGS

FIGS. 2A-2B illustrate the camera cover of FIG. 1 in a first position.

FIG. 9 illustrates an example ratchet-based alignment mechanism for a camera cover with multiple lenses in accordance with aspects of the present disclosure.

DETAILED DESCRIPTION

Figure 1:
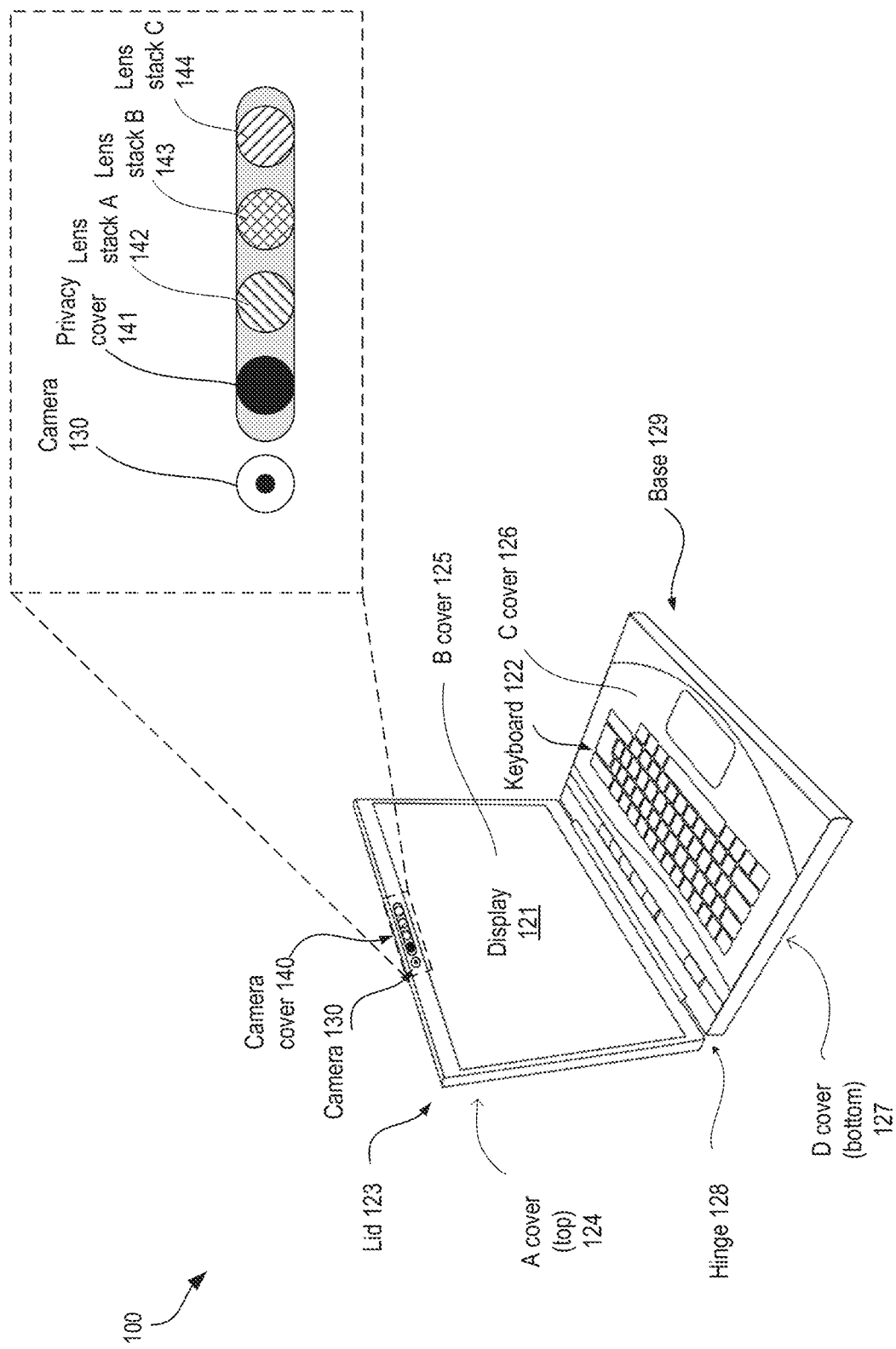
FIG. 1 illustrates an example computing device with a user-facing camera and a camera cover with multiple integrated lenses in accordance with aspects of the present disclosure.
Figure 3A:
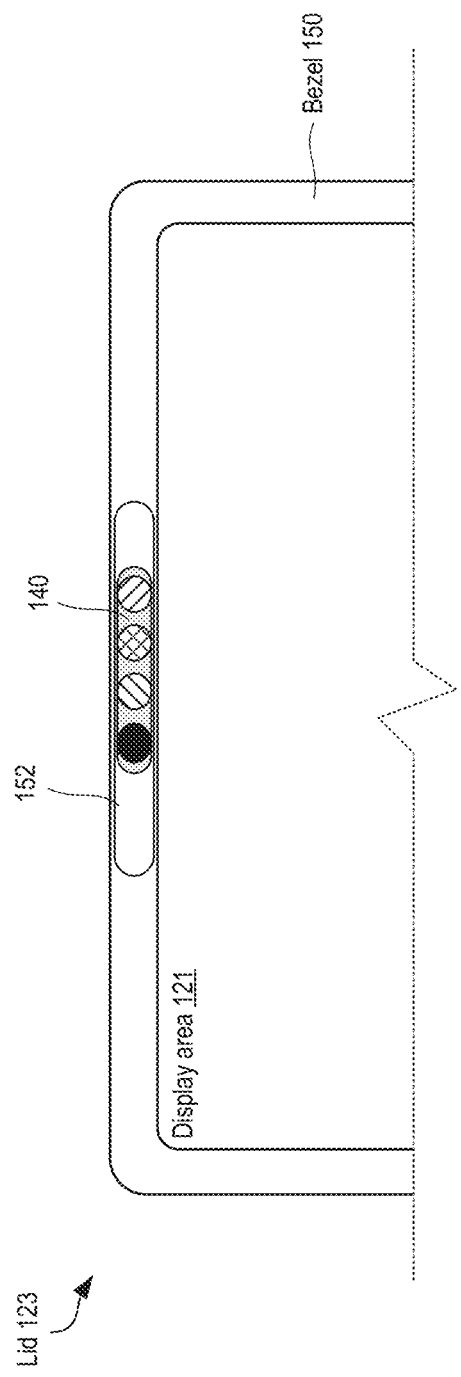
FIGS. 3A-3B illustrate the camera cover of FIG. 1 in a second position.
Figure 3B:
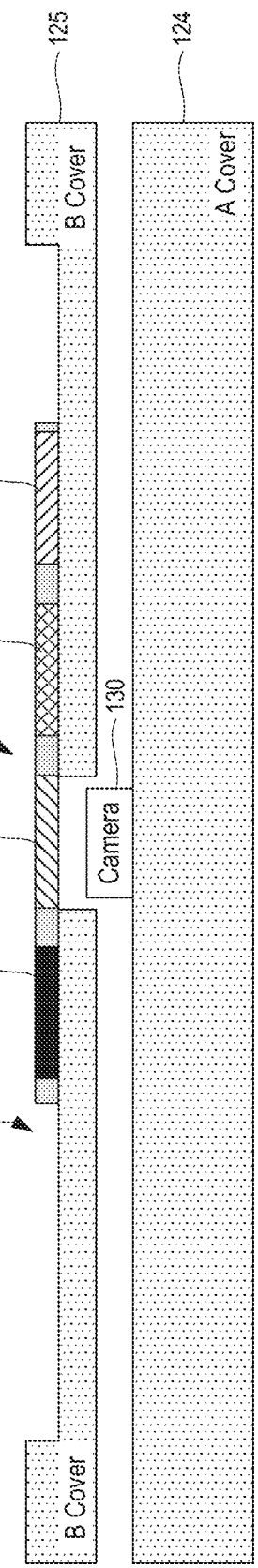
Figure 4A:
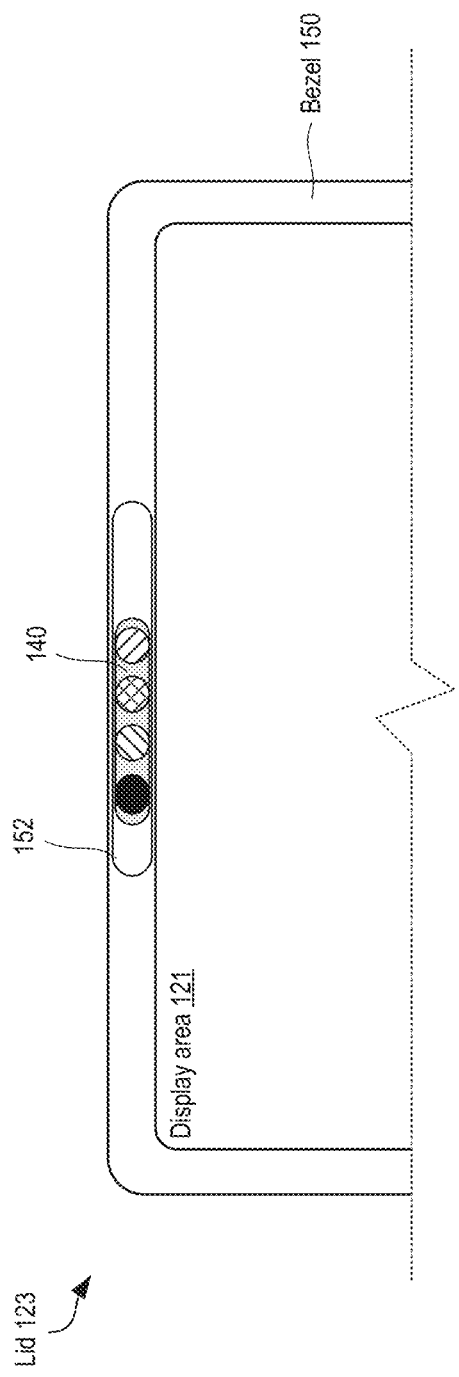
FIGS. 4A-4B illustrate the camera cover of FIG. 1 in a third position.
Figure 4B:
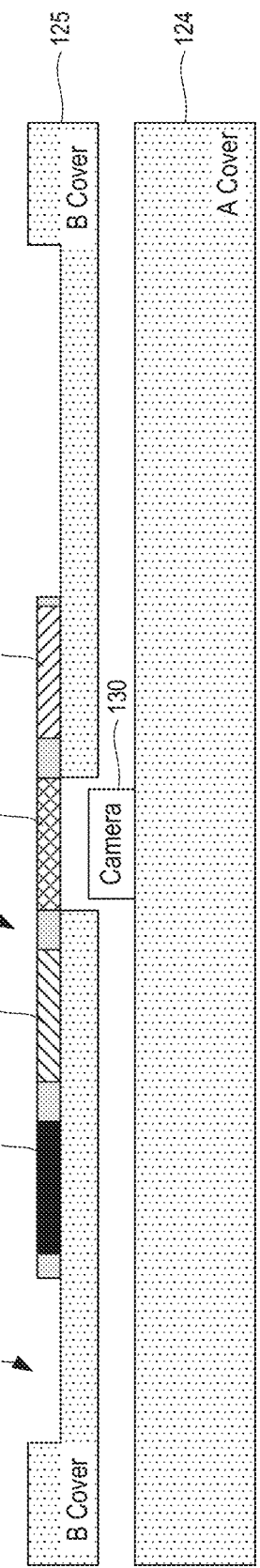
Figure 5A:
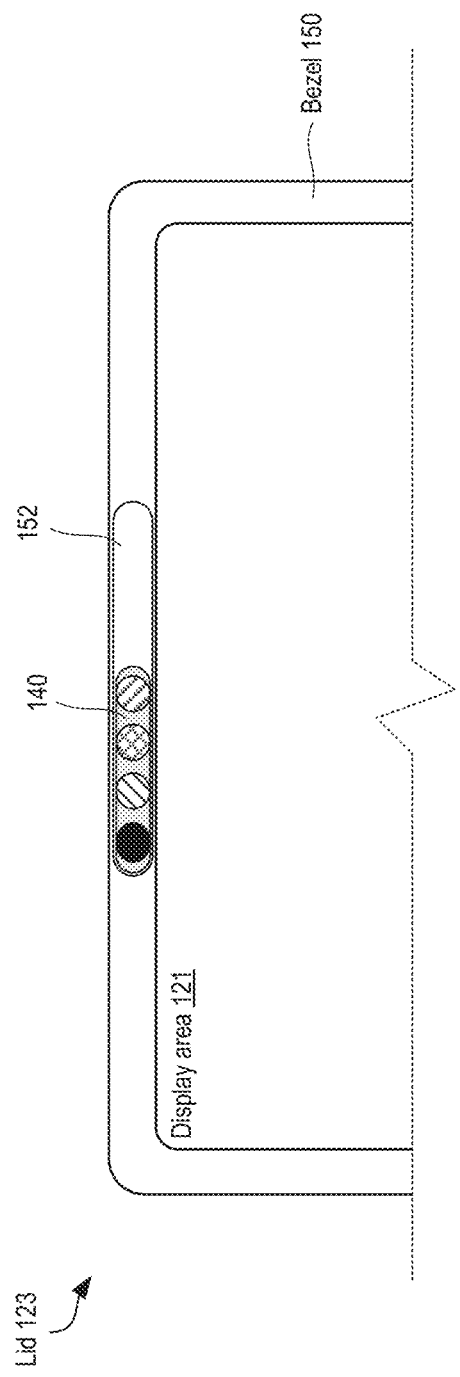
FIGS. 5A-5B illustrate the camera cover of FIG. 1 in a fourth position.
Figure 5B:
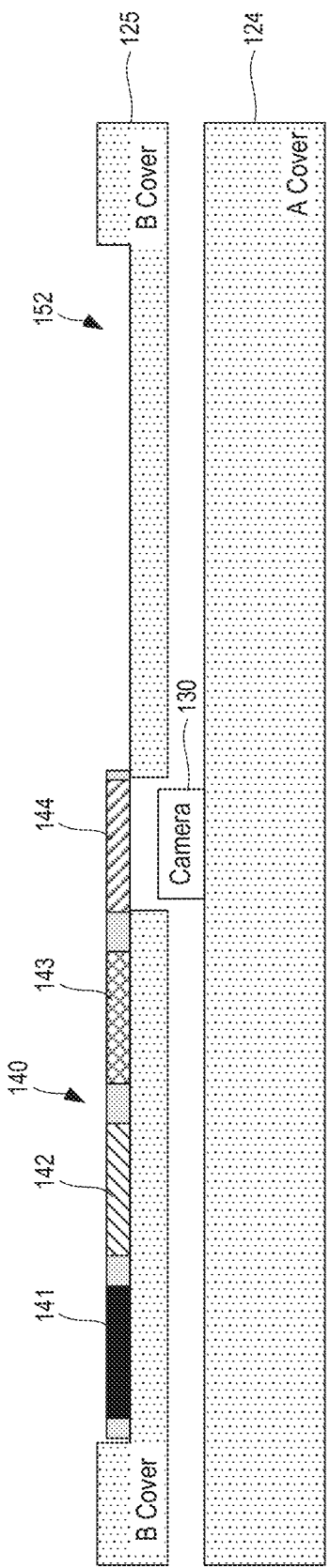

Embodiments described herein provide a camera cover for an integrated camera that includes multiple lenses or lens modules to provide a variety of image characteristics for a single camera sensor. Current computing systems may implement either a single camera system (with fixed image characteristics such as focal length, field of view (FOV), aperture, etc.) or a system of multiple cameras (which can provide a variety of image characteristics). Typically, the user-facing side of the computing device will implement a single camera system rather than the more expensive and more complex multi-camera system. To provide different image characteristics with such a single camera system, however, external devices (e.g., clip-on lens devices) or software-based solutions (e.g., artificial intelligence-based software) have been needed. However, these solutions are not ideal. For instance, with external add-on devices, such devices will need to be compatible with the user's computing system and the user will need to attach the device such that the lenses are in perfect or almost perfect alignment. Further, the user will need to carry the device separately from the computing device and may lose the external device. Moreover, software-based solutions may be demanding on the compute resources of the computing device (causing additional power consumption and corresponding loss in battery life), and may face operating system or other software compatibility issues.

In aspects of the present disclosure, multiple lenses or lens stacks may be integrated within a camera cover to provide different image characteristics for a single camera sensor. The camera cover may also include a portion that completely covers the camera sensor for privacy or other purposes. Each different lens/lens stack of the camera cover may be for a specific purpose, e.g., one for wide angle images, one with a larger aperture, one for fisheye images, etc. The camera cover can be manually or automatically adjusted to one of its various positions depending on which lens/lens stack is desired for a particular application. Accordingly, certain embodiments of the present disclosure may provide one or more advantages over current camera systems. For example, embodiments may provide multiple image characteristics for a single camera sensor at a relatively low cost, e.g., when compared with a multi-camera/sensor system. Embodiments herein may also allow for increased user experience by allowing for different image options in user-facing camera systems.

In the following description, specific details are set forth, but embodiments of the technologies described herein may be practiced without these specific details. Well-known circuits, structures, and techniques have not been shown in detail to avoid obscuring an understanding of this description. "An embodiment," "various embodiments," "some embodiments," and the like may include features, structures, or characteristics, but not every embodiment necessarily includes the particular features, structures, or characteristics.

Some embodiments may have some, all, or none of the features described for other embodiments. "First," "second," "third," and the like describe a common object and indicate different instances of like objects being referred to. Such adjectives do not imply objects so described must be in a given sequence, either temporally or spatially, in ranking, or any other manner. "Connected" may indicate elements are in direct physical or electrical contact with each other and "coupled" may indicate elements co-operate or interact with each other, but they may or may not be in direct physical or electrical contact. Terms modified by the word "substantially" include arrangements, orientations, spacings, or positions that vary slightly from the meaning of the unmodified term. For example, description of a lid of a mobile computing device that can rotate to substantially 360 degrees with respect to a base of the mobile computing includes lids that can rotate to within several degrees of 360 degrees with respect to a device base.

The description may use the phrases "in an embodiment," "in embodiments," "in some embodiments," and/or "in various embodiments," each of which may refer to one or more of the same or different embodiments. Furthermore, the terms "comprising," "including," "having," and the like, as used with respect to embodiments of the present disclosure, are synonymous.

Reference is now made to the drawings, which are not necessarily drawn to scale, wherein similar or same numbers may be used to designate same or similar parts in different figures. The use of similar or same numbers in different figures does not mean all figures including similar or same numbers constitute a single or same embodiment. Like numerals having different letter suffixes may represent different instances of similar components. The drawings illustrate generally, by way of example, but not by way of limitation, various embodiments discussed in the present document.

In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

While aspects of the present disclosure may be used in any suitable type of computing device, the examples below describe example mobile computing devices/environments in which embodiments of the present disclosure can be implemented.

FIG. 1 illustrates an example computing device 100 with a user-facing camera 130 and a camera cover 140 with multiple integrated lenses in accordance with aspects of the present disclosure. The computing device 100 can be a laptop (as shown) or another type of mobile computing device with a similar form factor, such as a foldable tablet or smartphone. In some instances, embodiments herein may be incorporated into a free-standing display monitor with a user-facing camera, which may be connected to a computing device that controls the display and camera.

The computing device 100 includes a housing, which includes a lid 123 with an A cover 124 that is a "world-facing" surface of the lid 123 when the computing device 100 is in a closed configuration and a B cover 125 that comprises a user-facing display 121 when the lid 123 is open (e.g., as shown). The computing device 100 also includes a base 129 with a C cover 126 that includes a keyboard 122 that is upward facing when the device 100 is an open configuration (e.g., as shown) and a D cover 127 that forms the bottom of the base 129. In some embodiments, the base 129 includes the primary computing resources (e.g., host processor unit(s), graphics processing unit (GPU)) of the device 100, along with a battery, memory, and storage, and communicates with the lid 123 via wires that pass through a hinge 128 that connects the base 129 with the lid 123. In some embodiments, the computing device 100 can be a dual display device with a second display comprising a portion of the C cover 126. For example, in some embodiments, an "always-on" display (AOD) can occupy a region of the C cover below the keyboard that is visible when the lid 123 is closed. In other embodiments, a second display covers most of the surface of the C cover and a removable keyboard can be placed over the second display or the second display can present a virtual keyboard to allow for keyboard input.

The example computing device 100 includes a user-facing camera 130 in the lid 123 as well as a camera cover 140 adjacent to the camera 130. The camera cover 140 is moveably coupled to the lid 123, which may include any suitable manner of coupling that allows for movement of the camera cover 140 while still being coupled to the lid 123. In the configuration shown, the camera cover 140 does not cover the user-facing camera 130; however, the cover 140 may be movable such that portions thereof (e.g., 141, 142, 143, 144) are aligned with the camera 130. In other embodiments, the camera cover 140 may be moveably coupled to the lid 123 in a way that ensures that at least a portion of the camera cover 140 is over the camera 130, in any position of the cover 140 while it is coupled to the lid 123. The camera cover 140 is coupled in a way that allows each respective lens (or privacy cover) of the camera cover 140 to be optically aligned with the camera sensor at a time.

For instance, the example cover 140 includes a privacy cover portion 141 that, when aligned with the camera 130, does not allow light into the camera/sensor (i.e., does not allow images to be viewed from the camera 130). The cover 140 also includes three different lens stacks 142, 143, 144. Each lens stack of the camera cover 140 may have different lens characteristics. For instance, the lens stack A 142 may be a more regular FOV lens stack, the lens stack B 143 may be a wide angle lens stack, and the lens stack C 144 may be a wide aperture lens stack. The wide angle lens stack 143 may provide a wider FOV than the regular FOV lens stack 142, and the wider aperture lens stack 144 may provide a shallower depth of field than then regular FOV lens stack 142.

Although the example camera cover 140 includes three lens stacks 142, 143, 144, embodiments herein may include two, four, five, or any other number of multiple lens stacks. Further, the lens characteristics that differ between the various lens stacks of the camera cover 140 may be different from the examples described above (i.e., characteristics in addition to/other than wide angle, aperture, etc. described above).

FIGS. 2-5 illustrate the camera cover 140 in various positions with respect to the camera 130. Each includes a top view of the camera and cover (the "A" portion of the FIG.) and a side/cross-sectional view of the camera and cover (the "B" portion of the FIG.). In the examples shown, the camera cover 140 is implemented as a slider within a cavity 152 of a bezel 150 of the B cover 125 of the lid 123. FIGS. 2A-2B illustrate the privacy cover portion 141 of the cover 140 being optically aligned with the camera 130, FIGS. 3A-3B illustrate the lens stack A 142 of the cover 140 being optically aligned with the camera 130, FIGS. 4A-4B illustrate the lens stack B 143 of the cover 140 being optically aligned with the camera 130, and FIGS. 5A-5B illustrate the lens stack C 144 of the cover 140 being optically aligned with the camera 130. In the example shown, the camera 130 may be include a camera sensor without a lens, or may include both a camera sensor and a lens (separate from the lenses/lens stacks of the camera cover 140).

FIGS. 6A-6D illustrate an example magnetic alignment mechanism for a privacy cover with multiple lenses in accordance with aspects of the present disclosure. In particular, FIGS. 6A-6D illustrate the magnetic alignment mechanism implemented within the camera cover 140 and B cover 125 described above; however, a similar magnetic alignment mechanism can be used in other camera covers that are implemented in accordance with embodiments described herein. The example magnetic alignment mechanism includes a set of N polarity magnets 602 ("N magnets") in the camera cover 140 and a set of S polarity magnets 604 ("S magnets") in the B cover 125. The N magnets 602 are arranged on either side of each of the cover portions (e.g., 141, 142, 143, 144), and the S magnets 604 are arranged at the same spacing as the N magnets within the B cover 125 such that particular pairs of the N magnets 602 and S magnets 604 will attract and align with each other when each portion of the camera cover is over the camera sensor. The magnets may be placed such that the optical axes of the camera/camera sensor and the lens stacks are aligned when the magnets are attracted to and aligned with each other. In this way, the magnetic alignment mechanism can cause self-alignment of the optical axes.

Figure 6A:
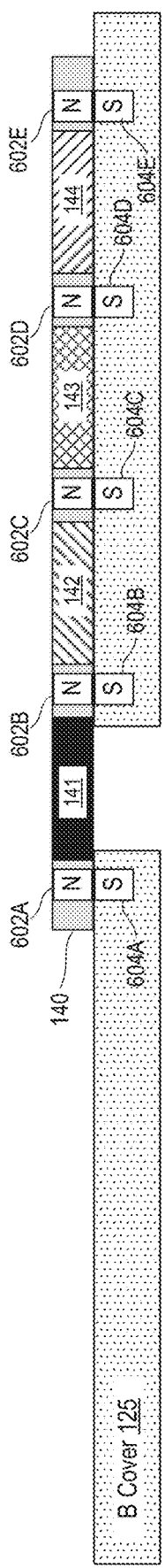
FIGS. 6A-6D illustrate an example magnetic alignment mechanism for a privacy cover with multiple lenses in accordance with aspects of the present disclosure.
Figure 6B:
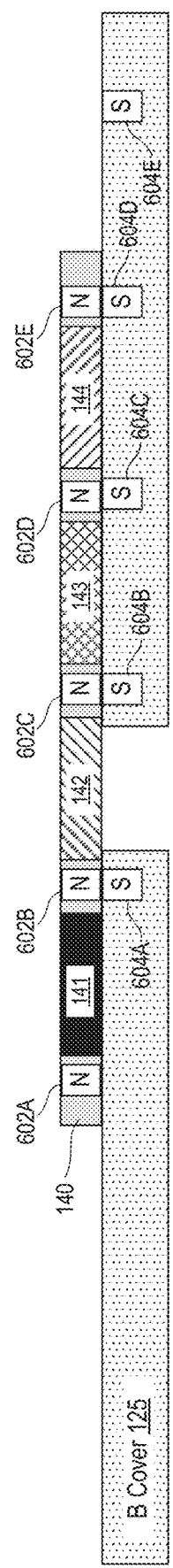
Figure 6C:
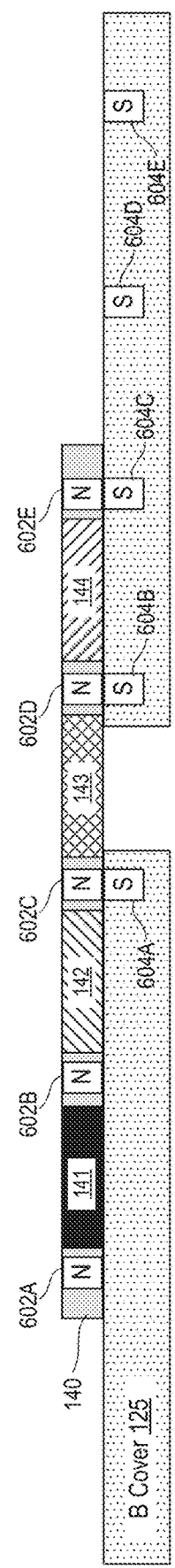
Figure 6D:
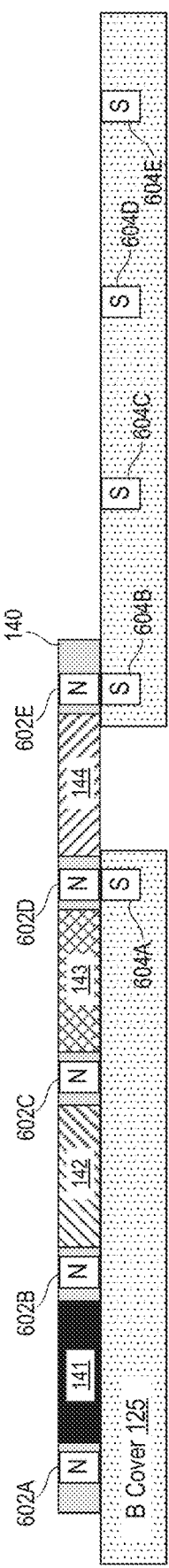

For instance, in FIG. 6A, the N magnet 602A is attracted to and thus aligned with the S magnet 604A when the privacy cover 141 is over the camera sensor (not shown). Likewise, the N magnet 602B is attracted to and thus aligned with the S magnet 604B, and so forth. In FIG. 6B, when the lens stack 142 is aligned with the camera sensor (not shown), the N magnet 602B is attracted to and thus aligned with the S magnet 604A and N magnet 602C is attracted to and thus aligned with the S magnet 604B. In FIG. 6C, when the lens stack 143 is aligned with the camera sensor (not shown), the N magnet 602C is attracted to and thus aligned with the S magnet 604A and N magnet 602D is attracted to and thus aligned with the S magnet 604B. In FIG. 6D, when the lens stack 144 is aligned with the camera sensor (not shown), the N magnet 602D is attracted to and thus aligned with the S magnet 604A and N magnet 602E is attracted to and thus aligned with the S magnet 604B.

Although shown with N magnets 602 in the camera cover 140 and the S magnets 604 in the B cover 125, the magnets may be arranged in a different manner, such as with the N magnets 602 in the B cover 125 and the S magnets 604 in the camera cover 140. In addition, the camera cover 140 and/or B cover 125 may include additional or fewer magnets than those shown. Further, the magnets of the magnetic alignment mechanism may be implemented in another orientation or manner that still allows for the magnets to self-align the different camera cover portions 141, 142, 143, 144 with the camera sensor as shown and remain generally in place.

Figure 7:
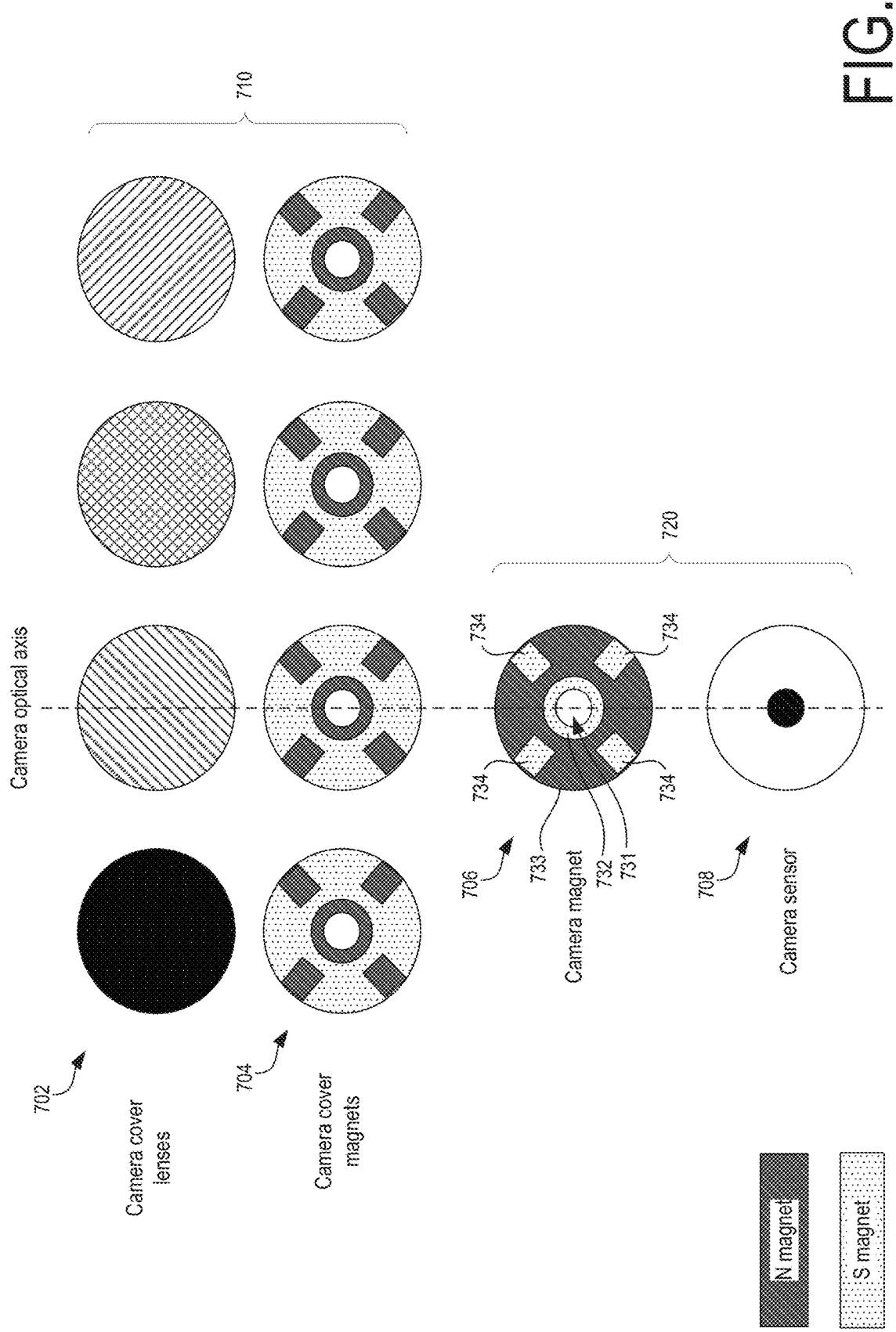
FIG. 7 illustrates another example magnetic alignment mechanism for a camera cover with multiple lenses in accordance with aspects of the present disclosure.

FIG. 7 illustrates another example magnetic alignment mechanism for a privacy cover with multiple lenses in accordance with aspects of the present disclosure. In particular, FIG. 7 illustrates an exploded view of the stack comprising a camera cover 710 (which may be implemented similar to cover 140) that includes the cover/lenses 702 and magnets 704, and camera stack 720 (e.g., in the B cover as described above), which includes a camera magnet 706 and a camera sensor 708. The magnets 704, 706 may each be multi-pole magnets that include portions with different magnetic polarity in a particular pattern or arrangement, e.g., as shown in FIG. 7. In the example shown, the magnets 704, 706 are each annular with a first portion 732 surrounding the hole 731 of the annular magnet, second portions 734 toward the outer edge of the annular magnet having the same polarity as the first portion 732, and a third remaining portion of the magnet 733 being of opposite polarity from the first and second portions. The magnets 704, 706 have the same general arrangement of magnetic poles, but with the poles being opposite from one another. The annular shape of the magnets 704, 706 allows light to pass from the lenses 702 through the center of the magnets and into the camera sensor 708. Although the lenses 702 are shown as having a different size than the hole of the annular magnets, in some embodiments, the lenses 702 may be of a different size. For example, the lenses 702 may be sized to fit within the holes of the annular magnets 704 so there is no additional vertical height needed in the computing device.

Although not shown specifically in FIGS. 6A-6D, the cover 140 may be placed as shown in FIGS. 2-5, i.e., within a cavity such as cavity 152 of the B cover 125. However, in some embodiments, there may not be a cavity in the B cover 125 like the cavity 152, and the cover 140 may slide along the outer bezel surface of the B cover 125. In addition, a cover in accordance with aspects of the present disclosure might be formed differently from the oval shaped cover shown in FIG. 1. For example, the camera cover may be rectangular shaped and sized to fit within a cavity such as cavity 152, or may be configured to slide on an outer bezel surface. As one example, the camera cover may be formed as shown in FIGS. 8A-8C, e.g., in an L-shape that fits and slides over a B cover (e.g., 825).

Figure 8A:
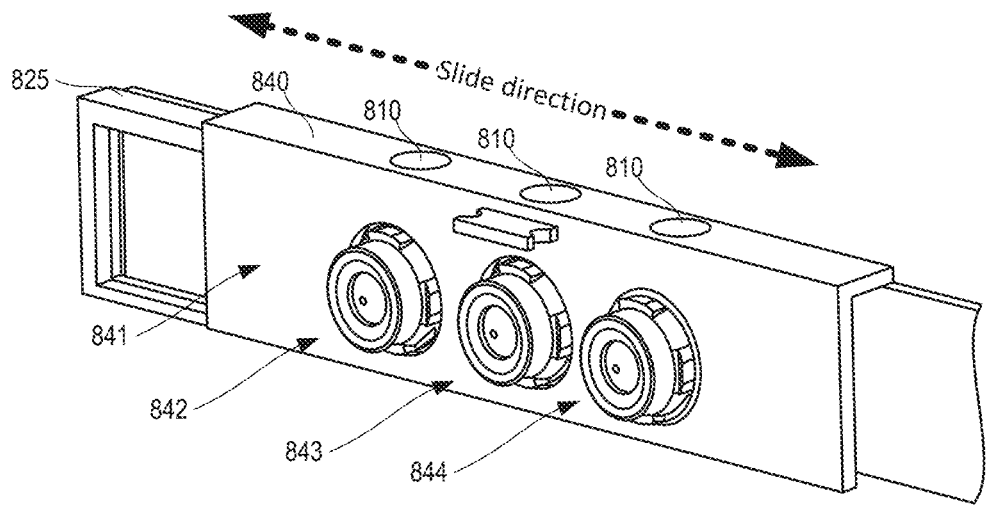
FIGS. 8A-8C illustrate an example implementation of a multi-lens camera cover with a magnetic alignment mechanism in accordance with aspects of the present disclosure.
Figure 8B:
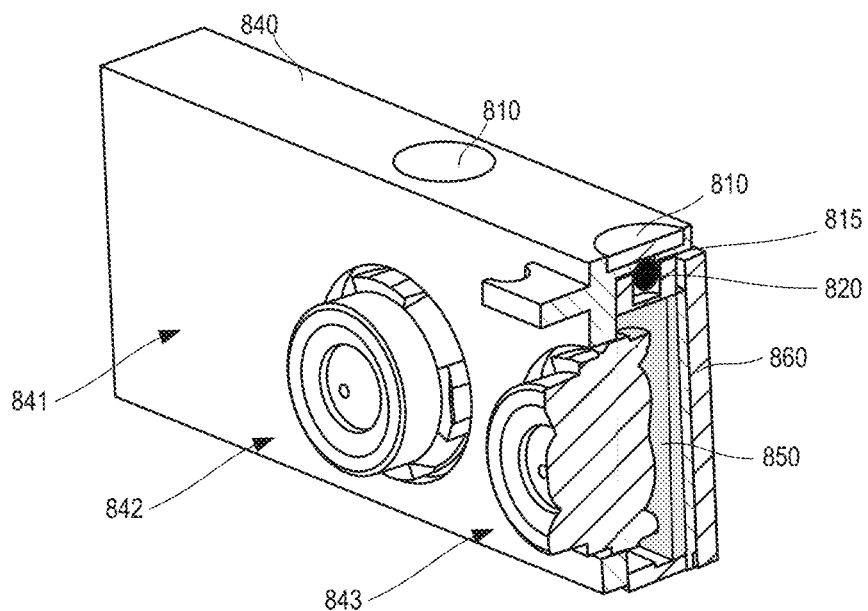
Figure 8C:
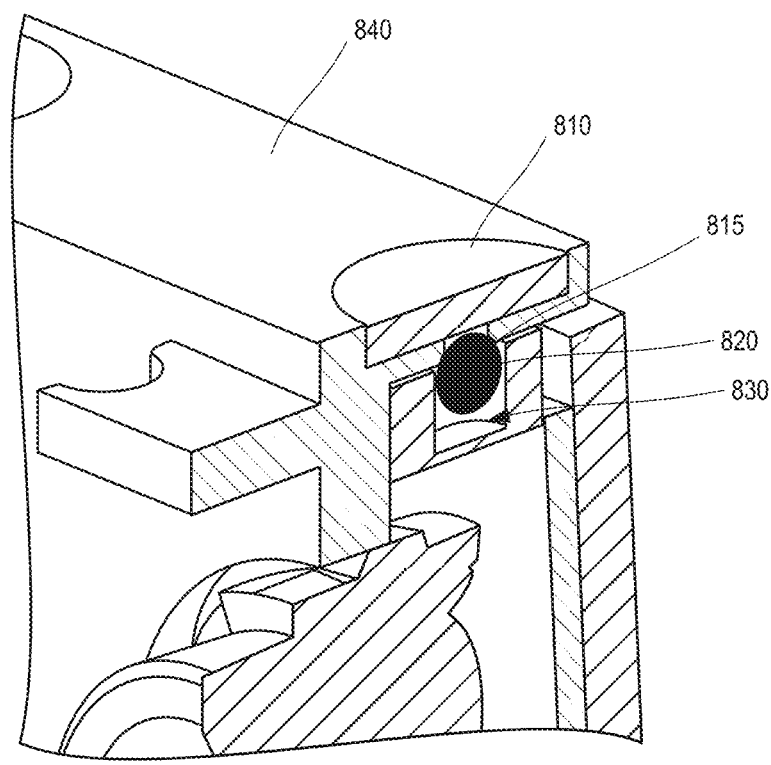

FIGS. 8A-8C illustrate an example implementation of a multi-lens camera cover 840 with a magnetic alignment mechanism in accordance with aspects of the present disclosure. In particular, FIG. 8A illustrates a perspective view of the camera cover 840, while FIG. 8B-8C illustrate detailed cross-sectional views of the cover 840. In the example shown, the camera cover 840 is coupled to a portion 825 of device, which may be, for example, a B cover of a laptop computing device or another outer surface of a mobile computing device (e.g., a tablet or mobile phone). Similar to the previous examples, the camera cover 840 includes a privacy cover 841 and three different lens stacks 842, 843, 844, each of which may be positioned above the camera sensor 850 of the device (which is attached to a printed circuit board (PCB) 860 of the device. The PCB 860 may be coupled to compute circuitry of the computing device, e.g., processor or other logic circuitry, memory, etc.

In the example shown, the camera cover 840 includes a set of magnetic "brakes" 810 that cause the cover 840 to stop in one of a set of positions over the camera sensor 850 as the cover 840 slides in the direction shown. The device includes one or more magnetic clutch bearings 820 within a respective cavity 830 of the device housing. The clutch bearings cause the cover 840 to stop in one of the set of positions. That is, when the cover 840 slides into one of the positions, the bearing 820 is pulled upward in the cavity 830 toward the magnetic brake 810 of the cover 840, which in turn causes the cover 840 to stay in the selected position (unless additional force is applied). The cover 840 may include a lead in chamfered edge 815 as shown in FIGS. 8B-8C that allows the cover 840 to "lock in" to a selected position while also being able to allow it to move to another position with some threshold amount of force.

FIG. 9 illustrates an example ratchet-based alignment mechanism for a camera cover with multiple lenses in accordance with aspects of the present disclosure. The example ratchet mechanism includes a sliding portion 940 that may be coupled to, or part of, a multi-lens camera cover similar to those described above. For example, the multiple lenses may be attached to the sliding portion 940 or may be formed in another portion of the sliding portion that is not shown in FIG. 9. The mechanism also includes a fixed portion 930 that may be coupled to or part of a device, e.g., a device housing such as an A cover or B cover as described above.

The sliding portion 940 includes a set of indentations 941-946, which may each coincide with a respective position of the camera cover over a camera sensor of a device in which the mechanism is incorporated (e.g., a particular lens of the multi-lens cover being over a camera sensor of the device). The sliding portion 940 moves along a fixed portion 930, with the movement being fixed into one of the set of positions based on the ratchet 920 coupled to the fixed portion 930. During operation, e.g., with the sliding portion sliding to the left side of FIG. 9, the ratchet 920 may move along the surface of the indentations 941-946 and lock into place within each indentation. Once it reaches the end of its travel (e.g., the ratchet at the right most portion of the sliding portion 940), it may remain in a position that allows the sliding portion to move back toward the right of FIG. 9.

FIGS. 10A-10D illustrates an example motor-based alignment mechanism for a camera cover with multiple lenses in accordance with aspects of the present disclosure. The example motor-based alignment mechanism includes a motor 1030 implemented within the B cover 1025 of the computing device, with a driving mechanism 1035 coupled between the motor 1030 and the camera cover 1040 to controllably move the camera cover 1040. The camera cover 1040 is implemented similar to the camera cover 140 described above, and includes a privacy cover 1041, a first lens stack 1042, and second lens stack 1043, and a third lens stack 1044. The motor 1030 may move the camera cover to one of four positions, i.e., where each of the privacy cover 1041, first lens stack 1042, second lens stack 1043, and third lens stack 1044 cover the camera sensor, and may do so based on comments from control circuitry within the computing device (e.g., in the base of a laptop computing device). The driving mechanism 1035 may be a screw-drive type mechanism or another type of mechanical driving system to suitably move the camera cover 1040. In some embodiments, the commands sent to the motor may be manual comments, e.g., commands from a user of the computing device, while in other embodiments, the commands may be sent based on software logic that changes the position of the camera cover 1040 based on a detected context, e.g., as shown in FIG. 11-12 and described below.

Figure 10A:
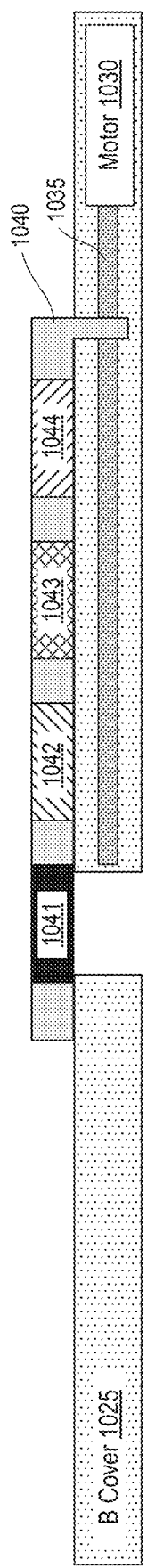
FIGS. 10A-10D illustrate an example motor-based alignment mechanism for a camera cover with multiple lenses in accordance with aspects of the present disclosure.
Figure 10B:
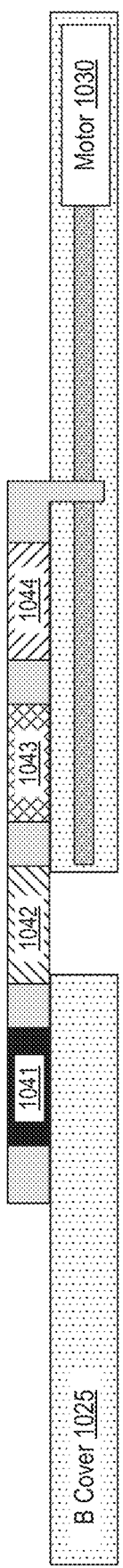
Figure 10C:
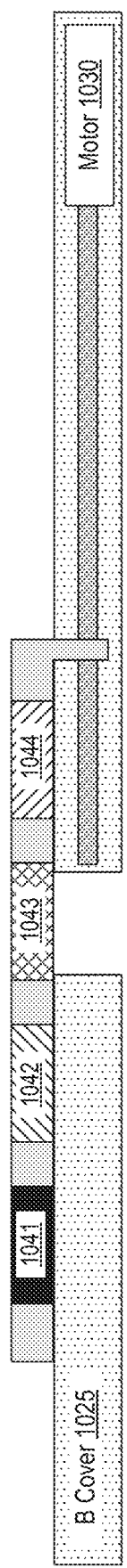
Figure 10D:
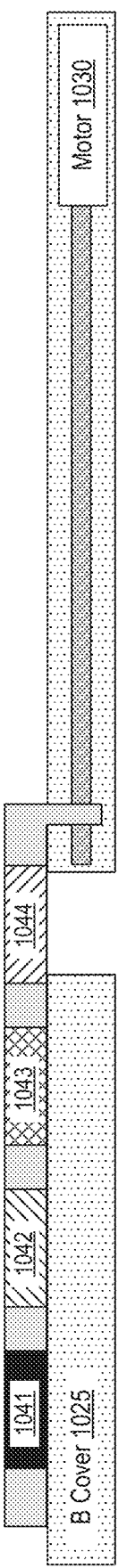
Figure 11:
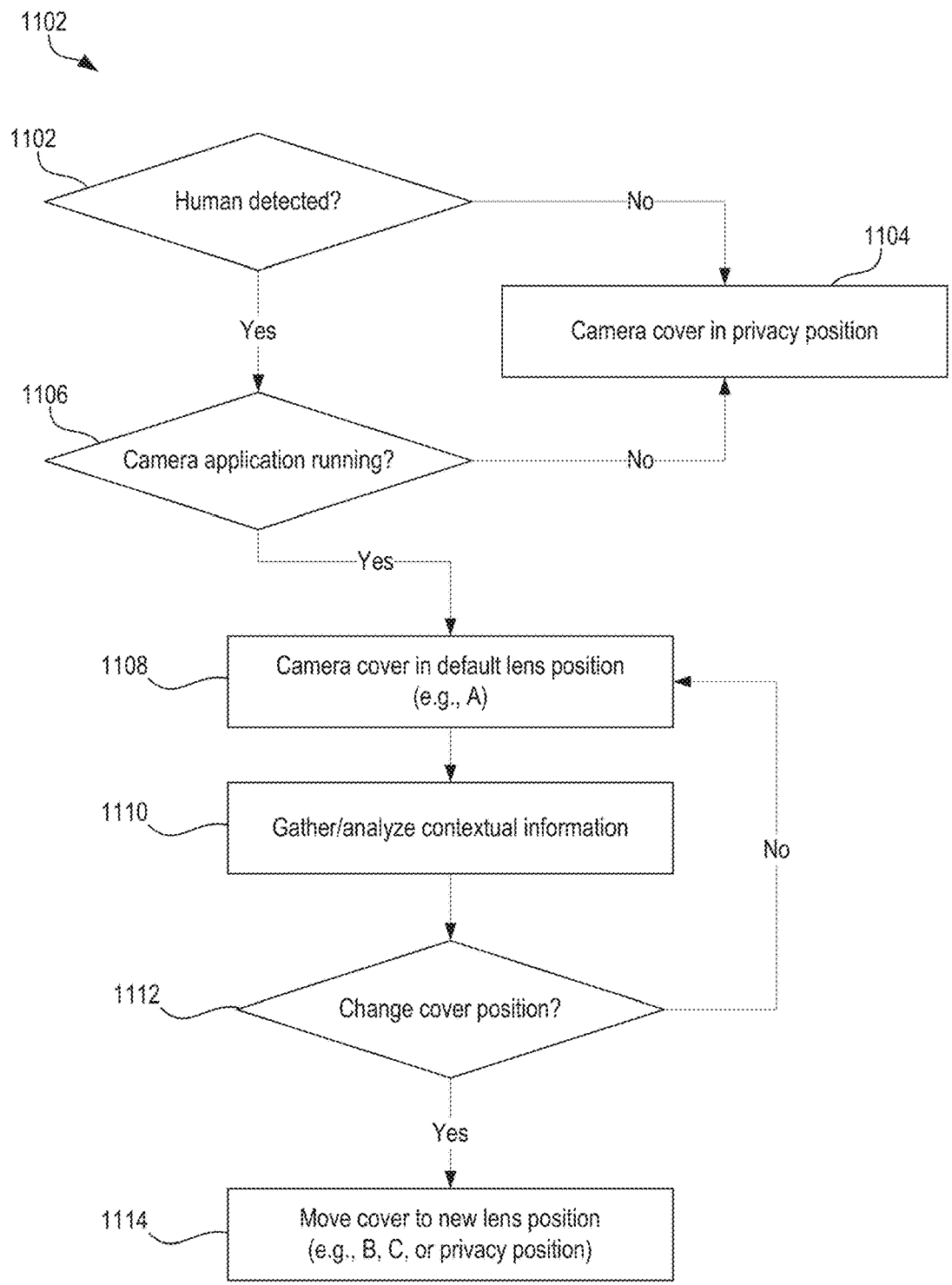
FIG. 11 illustrates an example flow diagram for controlling the position of the motor-based alignment mechanism of FIGS. 10A-10D.
Figure 12:
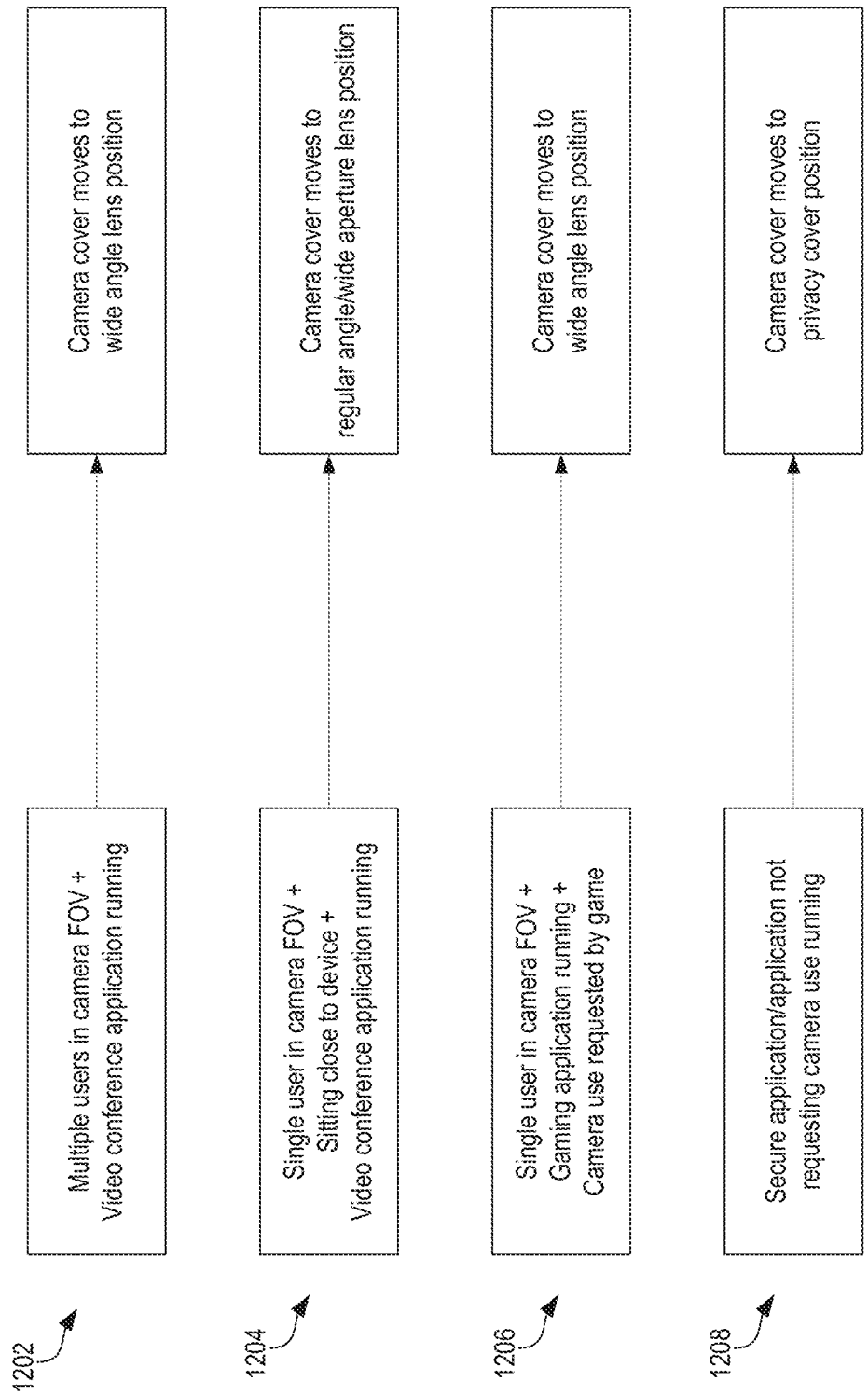
FIG. 12 illustrates example scenarios and resulting positions for a camera cover based on the flow diagram of FIG. 11.

FIG. 11 illustrates an example flow diagram 1100 for controlling the position of the motor-based alignment mechanism of FIGS. 10A-10D. The example flow diagram 1100 (or portions thereof) may be used, e.g., by a specific controller circuit or by other logic circuitry of a computing device (e.g., a processor) to control the position of a camera cover such as the camera cover 1040 of FIGS. 10A-10D. Using the flow diagram 1100 or aspects thereof, the controller or processing circuitry can determine an appropriate position for a camera cover based on the computing context, user position/presence, and/or one or more other factors. This may be done with or without input from a user of the computing device. The example shown might be used for a user-facing camera of a computing device, such as a laptop computer, a tablet computer, a mobile phone, or another type of mobile computing device.

Referring to the flow diagram 1100, the circuitry may detect at 1102 whether there is a human in front of the camera/inside the field of view of the camera. If no human is detected in front of the camera, then the camera cover (e.g., 1040) may be moved into the privacy position (e.g., the position shown in FIG. 10A) at 1104. This may be considered a default position of the camera cover in certain embodiments. However, if a human is detected in front of the camera at 1102, then the circuitry can determine at 1106 whether an application utilizing (or potentially utilizing) the camera is currently in use/running. If not, then the camera cover can be moved to the privacy position (E.g., that shown in FIG. 10A).

However, if there is a human detected and an application in use that is using/might use the camera, then the circuitry may determine that the camera cover is to be moved to a default lens position (e.g., that shown in FIG. 10B). The circuitry can then gather and analyze additional context information at 1110 (e.g., application switching, camera utilization, whether a human is still present, etc.) and at 1112, determine based on the additional context information whether to change the position of the camera cover. If it is determined that the camera cover position should not change, then it remains in the default lens position at 1108 and additional context information is gathered and analyzed at 1110. If the circuitry determines that the camera cover position should change (e.g., to those shown in FIGS. 10C-10D, or that shown in FIG. 10A), then the camera cover position may be moved accordingly (e.g., by a motor-driven mechanism as shown in FIGS. 10A-10D).

In some embodiments, e.g., systems where the camera cover positioning is to be performed manually by a user, the determined position can be indicated or otherwise suggested to the user. For example, the system can generate a message to the user prompting them to manually move the camera cover to the determined lens position, and may indicate that such a suggestion is based on the context and/or application being used.

FIG. 12 illustrates example scenarios and resulting positions for a privacy cover based on the flow diagram of FIG. 11. In the example scenario 1202, the controller/processing circuitry detects multiple users in the FOV of the camera and a video conference application currently running on the computing device. Because of the camera being used by the application with multiple users present, the controller/processing circuitry of the computing device may determine that the camera cover should move to a position that allows a wider FOV lens to be in front of the camera sensor of the device. In relative contrast, in the example scenario 1204, the controller/processing circuitry detects a single person in the camera FOV sitting close to the computing device and also detects a video conference application running. Because there is a single user in this context (with the same video conferencing application), the controller or processing circuitry of the computing device may determine that the camera cover should move to a position with a regular/narrower FOV lens in front of the camera sensor of the device.

In the example scenario 1206, the controller/processing circuitry detects a single user again in front of the camera while a gaming application is running on the device. The controller/processing circuitry also detects a request by the gaming application to use the camera. Based on the application being a gaming application, the controller/processing circuitry may accordingly determine that the wider FOV lens position should be used for the camera cover, e.g., to allow the user to move during gameplay (e.g., for a dancing game) and still be detected by the game's user positioning logic. This determination may also be made based on the type of gaming application. For instance, another gaming application might request use of the camera for video chat/conferencing purposes rather than positioning purposes. In such instances, the controller/processing circuitry might determine to use a regular FOV lens position for the camera cover.

In the example scenario 1208, the controller/processing circuitry detects a particular secure application running on the computing device or another application running in focus that is not currently requesting use of the camera. Based on such detections, the controller/processing circuitry may determine that the camera cover should move to the privacy position (e.g., that shown in FIG. 10A) for privacy and/or security purposes.

Figure 13A:
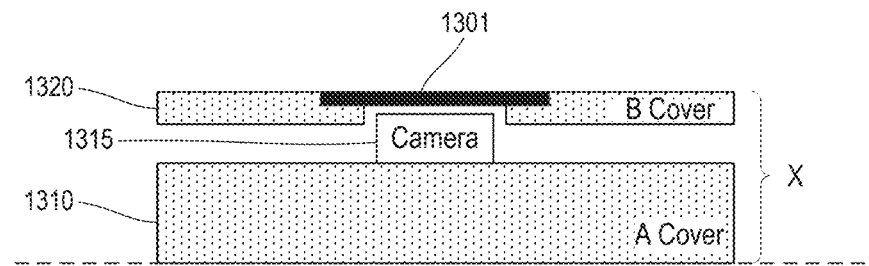
FIGS. 13A-13C illustrate various implementations of an integrated camera cover in accordance with aspects of the present disclosure compared with an example of a conventional camera cover.
Figure 13B:
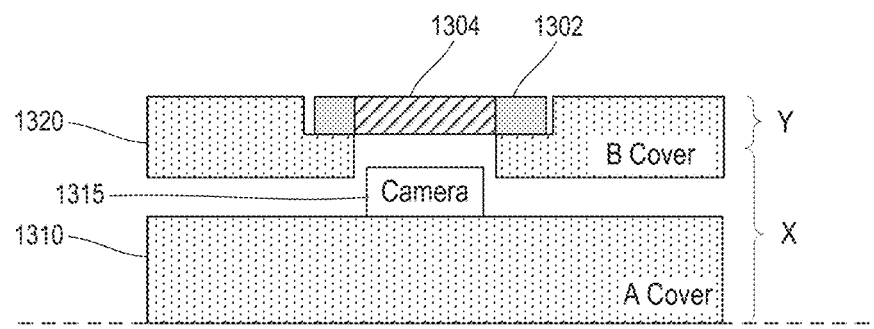
Figure 13C:
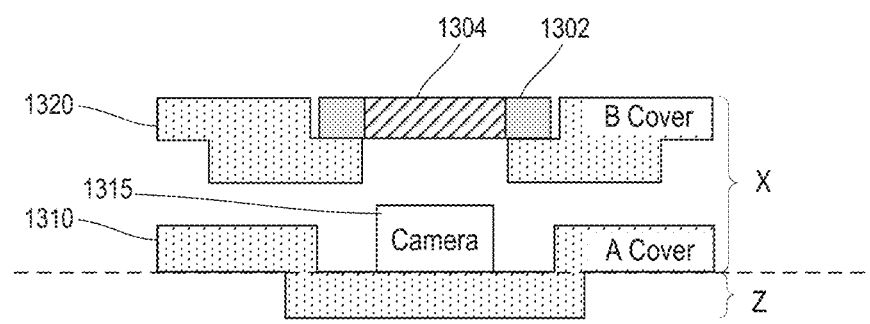

FIGS. 13A-13C illustrate various implementations of an integrated privacy cover in accordance with aspects of the present disclosure compared with an example of a conventional privacy cover. In particular, FIGS. 13A-13C illustrate height differences that might be seen in a computing device based on the inclusion of embodiments herein, and how they might be addressed in certain embodiments. In each example shown, a camera 1315 is coupled to the A cover 1310 of a computing device and the privacy shutter 1301/camera cover 1302 (with a lens 1304) is incorporated in or coupled to the B cover 1320 of the device.

FIG. 13A illustrates a typical privacy cover that might be incorporated into a device, whereby there is simply a shutter 1301 that covers/doesn't cover the camera 1315. This design is shown to have a reference vertical height of X when compared with the implementations with a multi-lens camera cover. Integrating multiple lenses/lens stacks into the camera cover might necessitate an increase the vertical height of the device to accommodate the additional thickness of the lenses (e.g., 1304). In the example shown in FIG. 13B, this additional height Y is added to the B cover 1320, causing an increase in the overall chassis thickness. This additional thickness is in the direction of the user, where the camera 13154 is a user-facing camera. In some embodiments, this can be addressed at least in part by the implementation shown in FIG. 13C, wherein the additional height is pushed into the device rather than out of the device toward the user (in a user-facing camera scenario). In particular, as shown, the reference height of the chassis generally remains at X (i.e., the same as in the system shown in FIG. 13A), but with a bump of height Z protruding in the direction opposite the camera cover 1302.

Figure 14:
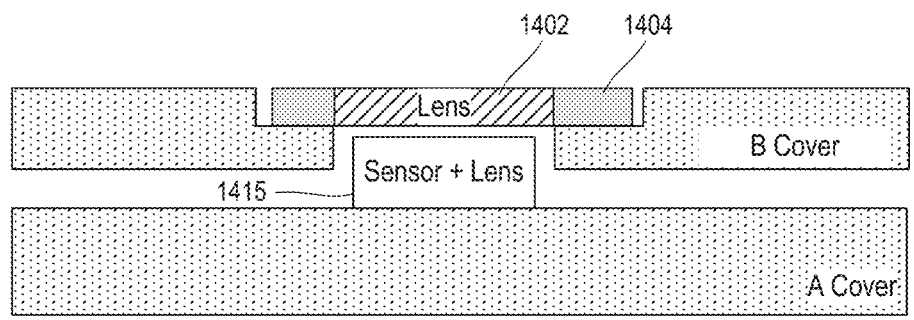
FIGS. 14-15 illustrate different implementations of the camera sensor and lens stack in a multi-lens privacy cover in accordance with aspects of the present disclosure.
Figure 15:
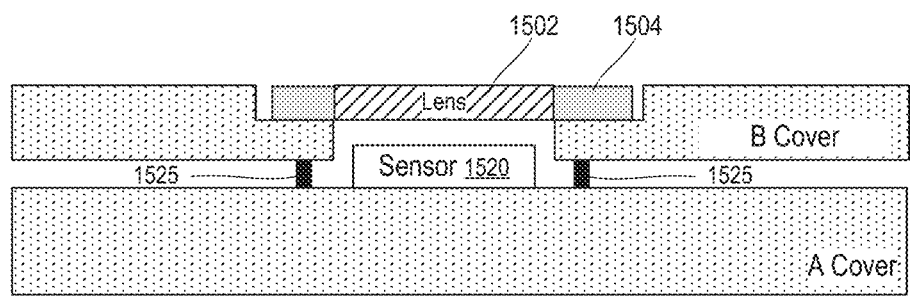

FIGS. 14-15 illustrate different implementations of the camera sensor and lens stack in a multi-lens privacy cover in accordance with aspects of the present disclosure. In particular, FIG. 14 illustrates an example embodiment that includes a lens stack 1402 in a camera cover 1404 that is positioned over a combined camera sensor and lens unit 1415. The camera sensor and lens unit 1415 may be a traditional camera unit that includes, for example, a complementary metal oxide semiconductor (CMOS)-based sensor on top of which a lens stack is mounted using a holder.

In contrast, FIG. 15 illustrates an example embodiment that includes a lens stack 1502 in the camera cover 1504 positioned over a camera sensor 1520. This embodiment, as compared with the one shown in FIG. 14, includes lens(es) within the lens stack 1412 that are optically the same as the combination of the lens 1402 and the lens within the camera sensor and lens unit 1415 of FIG. 14. That is, in the example shown, the CMOS sensor and the lens stack/holder in the unit 1415 are separated, with the lens of latter portion being effectively incorporated into the lens stack 1502 in the cover 1504 and the sensor 1520 remaining coupled to the A cover. Since the lens stack (plus holder and other associated structures) are effectively removed from the camera module itself in this embodiment, it may require a gasket 1525 to prevent light leakage into/out of the sensor 1520. In addition, there may also be included, for example, a low profile protective clear glass cover that is positioned around the sensor 1520 for protection.

Figure 16:
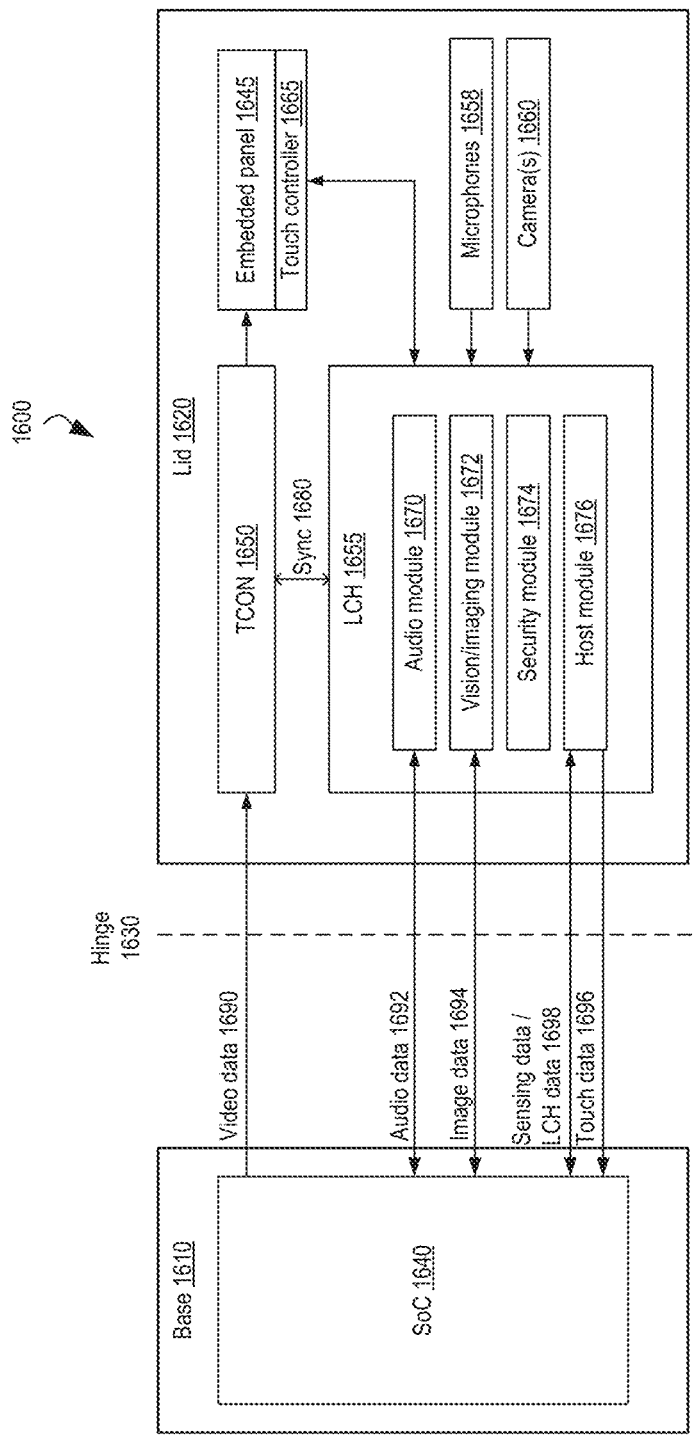
FIG. 16 illustrates example computing devices comprising a lid controller hub.

FIG. 16 illustrates an example mobile computing device in which aspects of the present disclosure may be incorporated. The example mobile computing devices shown implement a lid controller hub (e.g., 1655) with various circuitries that can enable a reduced number of wires across a hinge of the device, i.e., from the base 1610 to the lid 1620. In current systems, in particular, the video data stream may need its own wire/connection across the hinge due to the synchronous nature of the video data protocol, e.g., embedded DisplayPort (eDP). However, with aspects of the present disclosure, it may be possible to incorporate each of the data streams shown in FIG. 16, i.e., video data, audio data, image data, etc. across a single I/O connection, e.g., a Peripheral Component Interconnect Express (PCIe) connection, Compute Express Link (CXL) connection, Universal Serial Bus (USB) connection, etc.

FIG. 16 illustrates a block diagram of an example mobile computing device comprising a lid controller hub. The computing device 1600 comprises a base 1610 connected to a lid 1620 by a hinge 1630. The mobile computing device (also referred to herein as "user device") 1600 can be a laptop or a mobile computing device with a similar form factor. The base 1610 comprises a host system-on-a-chip (SoC) 1640 that comprises one or more processor units integrated with one or more additional components, such as a memory controller, graphics processing unit (GPU), caches, an image processing module, and other components described herein. The base 1610 can further comprise a physical keyboard, touchpad, battery, memory, storage, and external ports. The lid 1620 comprises an embedded display panel 1645, a timing controller (TCON) 1650, a lid controller hub (LCH) 1655, microphones 1658, one or more cameras 1660, and a touch controller 1665. TCON 1650 converts video data 1690 received from the SoC 1640 into signals that drive the display panel 1645.

The display panel 1645 can be any type of embedded display in which the display elements responsible for generating light or allowing the transmission of light are located in each pixel. Such displays may include TFT LCD (thin-film-transistor liquid crystal display), micro-LED (micro-light-emitting diode (LED)), OLED (organic LED), and QLED (quantum dot LED) displays. A touch controller 1665 drives the touchscreen technology utilized in the display panel 1645 and collects touch sensor data provided by the employed touchscreen technology. The display panel 1645 can comprise a touchscreen comprising one or more dedicated layers for implementing touch capabilities or 'in-cell' or 'on-cell' touchscreen technologies that do not require dedicated touchscreen layers.

The microphones 1658 can comprise microphones located in the bezel of the lid or in-display microphones located in the display area, the region of the panel that displays content. The one or more cameras 1660 can similarly comprise cameras located in the bezel or in-display cameras located in the display area.

LCH 1655 comprises an audio module 1670, a vision/imaging module 1672, a security module 1674, and a host module 1676. The audio module 1670, the vision/imaging module 1672 and the host module 1676 interact with lid sensors process the sensor data generated by the sensors. The audio module 1670 interacts with the microphones 1658 and processes audio sensor data generated by the microphones 1658, the vision/imaging module 1672 interacts with the one or more cameras 1660 and processes image sensor data generated by the one or more cameras 1660, and the host module 1676 interacts with the touch controller 1665 and processes touch sensor data generated by the touch controller 1665. A synchronization signal 1680 is shared between the timing controller 1650 and the lid controller hub 1655. The synchronization signal 1680 can be used to synchronize the sampling of touch sensor data and the delivery of touch sensor data to the SoC 1640 with the refresh rate of the display panel 1645 to allow for a smooth and responsive touch experience at the system level.

As used herein, the phrase "sensor data" can refer to sensor data generated or provided by sensor as well as sensor data that has undergone subsequent processing. For example, image sensor data can refer to sensor data received at a frame router in a vision/imaging module as well as processed sensor data output by a frame router processing stack in a vision/imaging module. The phrase "sensor data" can also refer to discrete sensor data (e.g., one or more images captured by a camera) or a stream of sensor data (e.g., a video stream generated by a camera, an audio stream generated by a microphone). The phrase "sensor data" can further refer to metadata generated from the sensor data, such as a gesture determined from touch sensor data or a head orientation or facial landmark information generated from image sensor data.

The audio module 1670 processes audio sensor data generated by the microphones 1658 and in some embodiments enables features such as Wake on Voice (causing the device 1600 to exit from a low-power state when a voice is detected in audio sensor data), Speaker ID (causing the device 1600 to exit from a low-power state when an authenticated user's voice is detected in audio sensor data), acoustic context awareness (e.g., filtering undesirable background noises), speech and voice pre-processing to condition audio sensor data for further processing by neural network accelerators, dynamic noise reduction, and audio-based adaptive thermal solutions.

The vision/imaging module 1672 processes image sensor data generated by the one or more cameras 1660 and in various embodiments can enable features such as Wake on Face (causing the device 1600 to exit from a low-power state when a face is detected in image sensor data) and Face ID (causing the device 1600 to exit from a low-power state when an authenticated user's face is detected in image sensor data). In some embodiments, the vision/imaging module 1672 can enable one or more of the following features: head orientation detection, determining the location of facial landmarks (e.g., eyes, mouth, nose, eyebrows, cheek) in an image, and multi-face detection.

The host module 1676 processes touch sensor data provided by the touch controller 1665. The host module 1676 is able to synchronize touch-related actions with the refresh rate of the embedded panel 1645. This allows for the synchronization of touch and display activities at the system level, which provides for an improved touch experience for any application operating on the mobile computing device.

The hinge 1630 can be any physical hinge that allows the base 1610 and the lid 1620 to be rotatably connected. The wires that pass across the hinge 1630 comprise wires for passing video data 1690 from the SoC 1640 to the TCON 1650, wires for passing audio data 1692 between the SoC 1640 and the audio module 1670, wires for providing image data 1694 from the vision/imaging module 1672 to the SoC 1640, wires for providing touch data 1696 from the LCH 1655 to the SoC 1640, and wires for providing data 1698 determined from image sensor data and other information generated by the LCH 1655 from the host module 1676 to the SoC 1640. In some embodiments, data shown as being passed over different sets of wires between the SoC and LCH are communicated over the same set of wires. For example, in some embodiments, all of the different types of data shown can be sent over a single PCIe-based or USB-based data bus.

In some embodiments, the lid 1620 is removably attachable to the base 1610. In some embodiments, the hinge can allow the base 1610 and the lid 1620 to rotate to substantially 360 degrees with respect to each other. In some embodiments, the hinge 1630 carries fewer wires to communicatively couple the lid 1620 to the base 1610 relative to existing computing devices that do not have an LCH. This reduction in wires across the hinge 1630 can result in lower device cost, not just due to the reduction in wires, but also due to being a simpler electromagnetic and radio frequency interface (EMI/RFI) solution.

The components illustrated in FIG. 16 as being located in the base of a mobile computing device can be located in a base housing and components illustrated in FIG. 16 as being located in the lid of a mobile computing device can be located in a lid housing.

Figure 17:
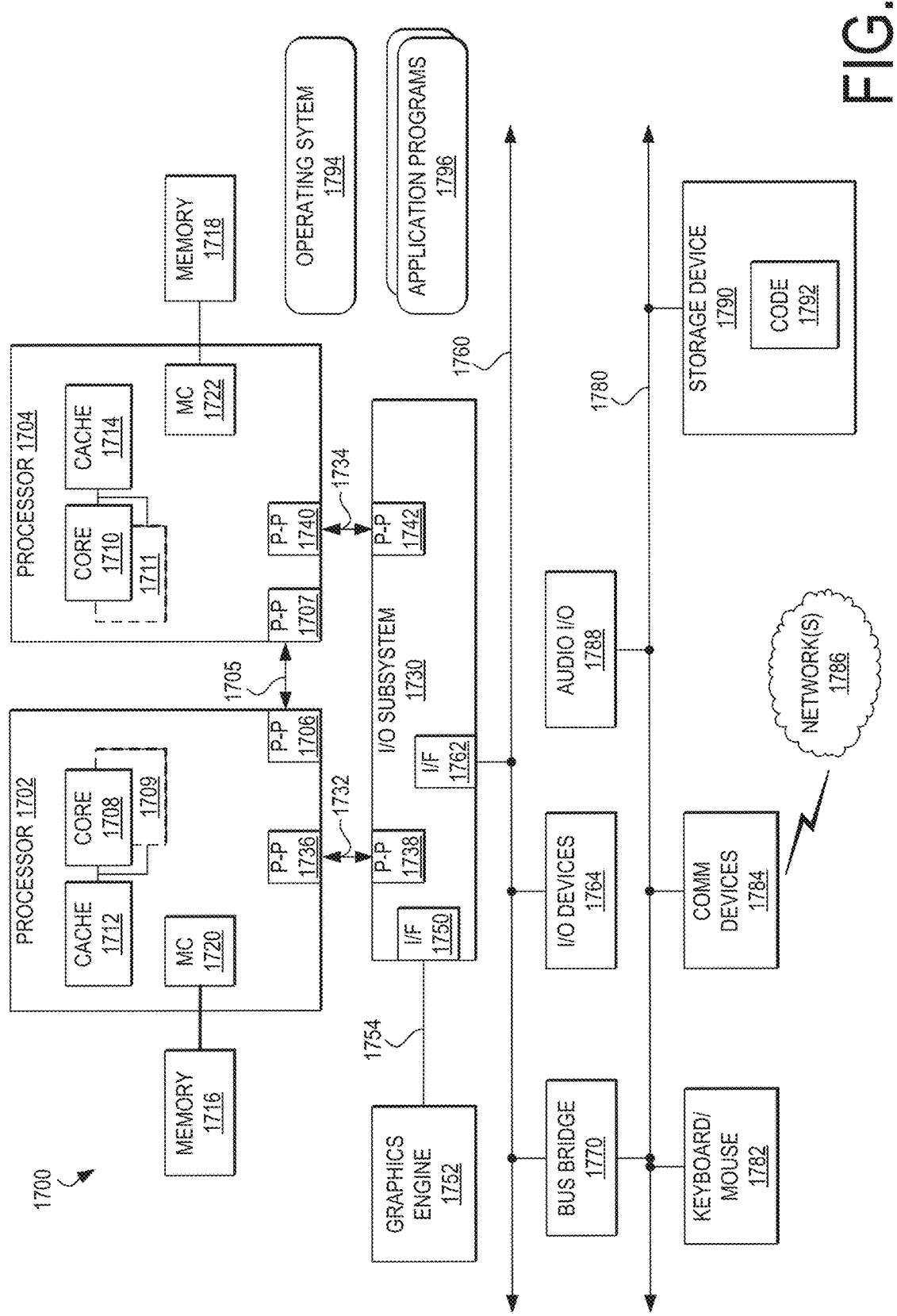
FIG. 17 is a block diagram of computing device components in a base of an example mobile computing device comprising a lid controller hub.

FIG. 17 is a block diagram of computing device components in a base of an example mobile computing device comprising a lid controller hub. Generally, components shown in FIG. 17 can communicate with other shown components, including those in a lid controller hub, although not all connections are shown, for ease of illustration. The components 1700 comprise a multiprocessor system comprising a first processor 1702 and a second processor 1704 and is illustrated as comprising point-to-point (P-P) interconnects. For example, a point-to-point (P-P) interface 1706 of the processor 1702 is coupled to a point-to-point interface 1707 of the processor 1704 via a point-to-point interconnection 1705. It is to be understood that any or all of the point-to-point interconnects illustrated in FIG. 17 can be alternatively implemented as a multi-drop bus, and that any or all buses illustrated in FIG. 17 could be replaced by point-to-point interconnects.

As shown in FIG. 17, the processors 1702 and 1704 are multicore processors. Processor 1702 comprises processor cores 1708 and 1709, and processor 1704 comprises processor cores 1710 and 1711. Processor cores 1708-1711 can execute computer-executable instructions in a manner similar to that discussed below in connection with FIG. 10, or in other manners.

Processors 1702 and 1704 further comprise at least one shared cache memory 1712 and 1714, respectively. The shared caches 1712 and 1714 can store data (e.g., instructions) utilized by one or more components of the processor, such as the processor cores 1708-1709 and 1710-1711. The shared caches 1712 and 1714 can be part of a memory hierarchy for the device. For example, the shared cache 1712 can locally store data that is also stored in a memory 1716 to allow for faster access to the data by components of the processor 1702. In some embodiments, the shared caches 1712 and 1714 can comprise multiple cache layers, such as level 1 (L1), level 2 (L2), level 3 (L3), level 4 (L4), and/or other caches or cache layers, such as a last level cache (LLC).

Although two processors are shown, the device can comprise any number of processors or other compute resources, including those in a lid controller hub. Further, a processor can comprise any number of processor cores. A processor can take various forms such as a central processing unit, a controller, a graphics processor, an accelerator (such as a graphics accelerator, digital signal processor (DSP), or artificial intelligence (AI) accelerator)). A processor in a device can be the same as or different from other processors in the device. In some embodiments, the device can comprise one or more processors that are heterogeneous or asymmetric to a first processor, accelerator, field programmable gate array (FPGA), or any other processor. There can be a variety of differences between the processing elements in a system in terms of a spectrum of metrics of merit including architectural, microarchitectural, thermal, power consumption characteristics and the like. These differences can effectively manifest themselves as asymmetry and heterogeneity amongst the processors in a system. In some embodiments, the processors 1702 and 1704 reside in a multi-chip package. As used herein, the terms "processor unit" and "processing unit" can refer to any processor, processor core, component, module, engine, circuitry or any other processing element described herein. A processor unit or processing unit can be implemented in hardware, software, firmware, or any combination thereof capable of. A lid controller hub can comprise one or more processor units.

Processors 1702 and 1704 further comprise memory controller logic (MC) 1720 and 1722. As shown in FIG. 17, MCs 1720 and 1722 control memories 1716 and 1718 coupled to the processors 1702 and 1704, respectively. The memories 1716 and 1718 can comprise various types of memories, such as volatile memory (e.g., dynamic random-access memories (DRAM), static random-access memory (SRAM)) or non-volatile memory (e.g., flash memory, solid-state drives, chalcogenide-based phase-change non-volatile memories). While MCs 1720 and 1722 are illustrated as being integrated into the processors 1702 and 1704, in alternative embodiments, the MCs can be logic external to a processor, and can comprise one or more layers of a memory hierarchy.

Processors 1702 and 1704 are coupled to an Input/Output (I/O) subsystem 1730 via P-P interconnections 1732 and 1734. The point-to-point interconnection 1732 connects a point-to-point interface 1736 of the processor 1702 with a point-to-point interface 1738 of the I/O subsystem 1730, and the point-to-point interconnection 1734 connects a point-to-point interface 1740 of the processor 1704 with a point-to-point interface 1742 of the I/O subsystem 1730. Input/Output subsystem 1730 further includes an interface 1750 to couple I/O subsystem 1730 to a graphics module 1752, which can be a high-performance graphics module. The I/O subsystem 1730 and the graphics module 1752 are coupled via a bus 1754. Alternately, the bus 1754 could be a point-to-point interconnection.

Input/Output subsystem 1730 is further coupled to a first bus 1760 via an interface 1762. The first bus 1760 can be a Peripheral Component Interconnect (PCI) bus, a PCI Express (PCIe) bus, another third generation I/O (input/output) interconnection bus or any other type of bus.

Various I/O devices 1764 can be coupled to the first bus 1760. A bus bridge 1770 can couple the first bus 1760 to a second bus 1780. In some embodiments, the second bus 1780 can be a low pin count (LPC) bus. Various devices can be coupled to the second bus 1780 including, for example, a keyboard/mouse 1782, audio I/O devices 1788 and a storage device 1790, such as a hard disk drive, solid-state drive or other storage device for storing computer-executable instructions (code) 1792. The code 1792 can comprise computer-executable instructions for performing technologies described herein. Additional components that can be coupled to the second bus 1780 include communication device(s) or unit(s) 1784, which can provide for communication between the device and one or more wired or wireless networks 1786 (e.g. Wi-Fi, cellular or satellite networks) via one or more wired or wireless communication links (e.g., wire, cable, Ethernet connection, radio-frequency (RF) channel, infrared channel, Wi-Fi channel) using one or more communication standards (e.g., IEEE 802.11 standard and its supplements).

The device can comprise removable memory such as flash memory cards (e.g., SD (Secure Digital) cards), memory sticks, Subscriber Identity Module (SIM) cards). The memory in the computing device (including caches 1712 and 1714, memories 1716 and 1718 and storage device 1790, and memories in the lid controller hub) can store data and/or computer-executable instructions for executing an operating system 1794, or application programs 1796. Example data includes web pages, text messages, images, sound files, video data, sensor data or any other data received from a lid controller hub, or other data sets to be sent to and/or received from one or more network servers or other devices by the device via one or more wired or wireless networks, or for use by the device. The device can also have access to external memory (not shown) such as external hard drives or cloud-based storage.

The operating system 1794 can control the allocation and usage of the components illustrated in FIG. 17 and support one or more application programs 1796. The application programs 1796 can include common mobile computing device applications (e.g., email applications, calendars, contact managers, web browsers, messaging applications) as well as other computing applications.

The device can support various input devices, such as a touchscreen, microphones, cameras (monoscopic or stereoscopic), trackball, touchpad, trackpad, mouse, keyboard, proximity sensor, light sensor, pressure sensor, infrared sensor, electrocardiogram (ECG) sensor, PPG (photoplethysmogram) sensor, galvanic skin response sensor, and one or more output devices, such as one or more speakers or displays. Any of the input or output devices can be internal to, external to or removably attachable with the device. External input and output devices can communicate with the device via wired or wireless connections.

In addition, the computing device can provide one or more natural user interfaces (NUIs). For example, the operating system 1794, applications 1796, or a lid controller hub can comprise speech recognition as part of a voice user interface that allows a user to operate the device via voice commands. Further, the device can comprise input devices and components that allows a user to interact with the device via body, hand, or face gestures.

The device can further comprise one or more communication components 1784. The components 1784 can comprise wireless communication components coupled to one or more antennas to support communication between the device and external devices. Antennas can be located in a base, lid, or other portion of the device. The wireless communication components can support various wireless communication protocols and technologies such as Near Field Communication (NFC), IEEE 1002.11 (Wi-Fi) variants, WiMax, Bluetooth, Zigbee, 4G Long Term Evolution (LTE), Code Division Multiplexing Access (CDMA), Universal Mobile Telecommunication System (UMTS) and Global System for Mobile Telecommunication (GSM). In addition, the wireless modems can support communication with one or more cellular networks for data and voice communications within a single cellular network, between cellular networks, or between the mobile computing device and a public switched telephone network (PSTN).

The device can further include at least one input/output port (which can be, for example, a USB, IEEE 1394 (FireWire), Ethernet and/or RS-232 port) comprising physical connectors; a power supply (such as a rechargeable battery); a satellite navigation system receiver, such as a GPS receiver; a gyroscope; an accelerometer; and a compass. A GPS receiver can be coupled to a GPS antenna. The device can further include one or more additional antennas coupled to one or more additional receivers, transmitters and/or transceivers to enable additional functions.

FIG. 17 illustrates one example computing device architecture. Computing devices based on alternative architectures can be used to implement technologies described herein. For example, instead of the processors 1702 and 1704, and the graphics module 1752 being located on discrete integrated circuits, a computing device can comprise a SoC (system-on-a-chip) integrated circuit incorporating one or more of the components illustrated in FIG. 17. In one example, an SoC can comprise multiple processor cores, cache memory, a display driver, a GPU, multiple I/O controllers, an AI accelerator, an image processing unit driver, I/O controllers, an AI accelerator, an image processor unit. Further, a computing device can connect elements via bus or point-to-point configurations different from that shown in FIG. 17. Moreover, the illustrated components in FIG. 17 are not required or all-inclusive, as shown components can be removed and other components added in alternative embodiments.

Figure 18:
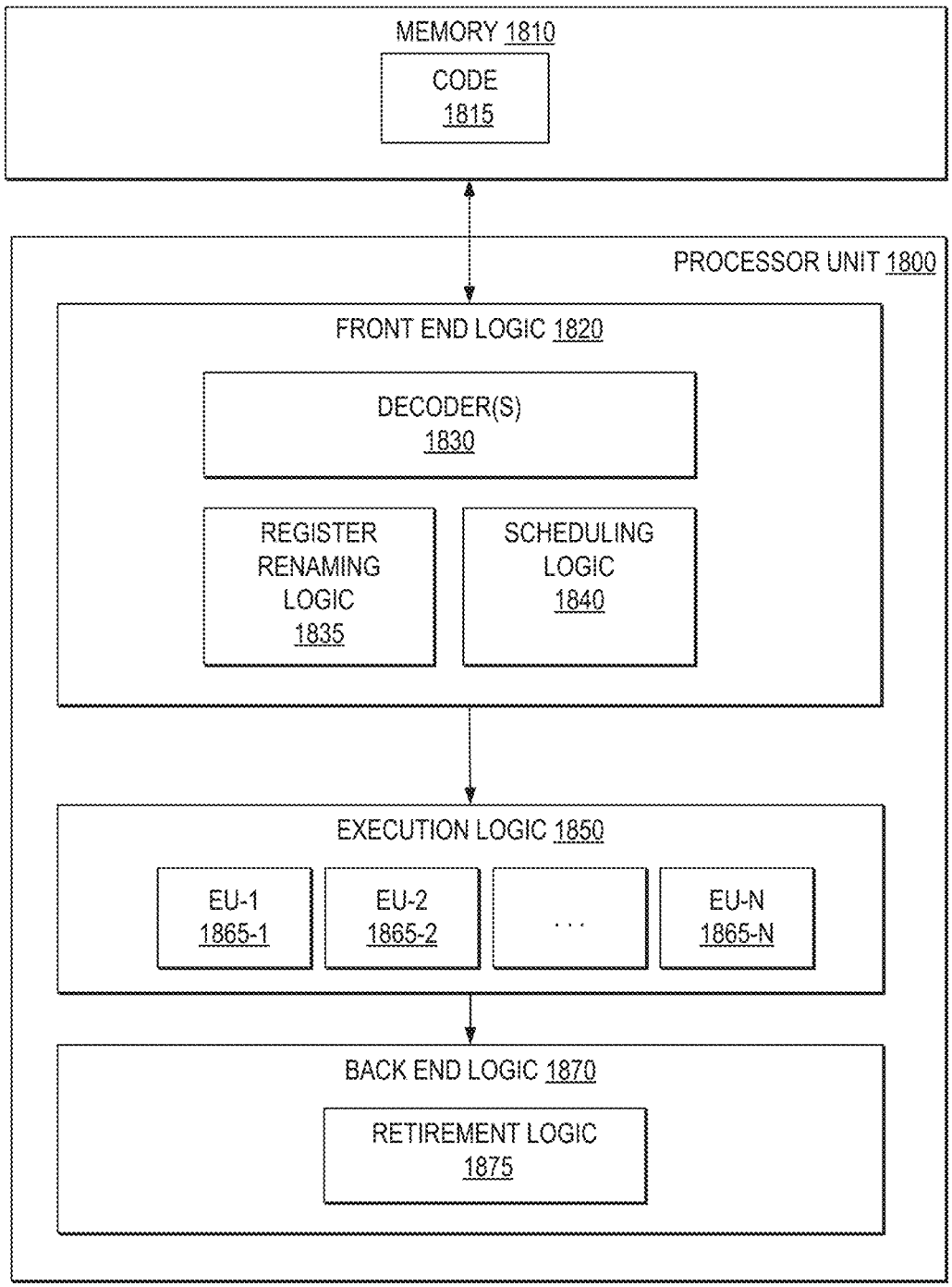
FIG. 18 is a block diagram of an exemplary processor unit that can execute instructions as part of implementing technologies described herein.

FIG. 18 is a block diagram of an example processor unit 1800 to execute computer-executable instructions as part of implementing a lid controller hub. The processor unit 1800 can be any type of processor or processor core, such as a microprocessor, an embedded processor, a digital signal processor (DSP), network processor, or accelerator. The processor unit 1800 can be a single-threaded core or a multithreaded core in that it may include more than one hardware thread context (or "logical processor") per core.

FIG. 18 also illustrates a memory 1810 coupled to the processor 1800. The memory 1810 can be any memory described herein or any other memory known to those of skill in the art. The memory 1810 can store computer-executable instructions 1815 (code) executable by the processor unit 1800.

The processor core comprises front-end logic 1820 that receives instructions from the memory 1810. An instruction can be processed by one or more decoders 1830. The decoder 1830 can generate as its output a micro operation such as a fixed width micro operation in a predefined format, or generate other instructions, microinstructions, or control signals, which reflect the original code instruction. The front-end logic 1820 further comprises register renaming logic 1835 and scheduling logic 1840, which generally allocate resources and queues operations corresponding to converting an instruction for execution.

The processor unit 1800 further comprises execution logic 1850, which comprises one or more execution units (EUs) 1865-1 through 1865-N. Some processor core embodiments can include a number of execution units dedicated to specific functions or sets of functions. Other embodiments can include only one execution unit or one execution unit that can perform a particular function. The execution logic 1850 performs the operations specified by code instructions. After completion of execution of the operations specified by the code instructions, back end logic 1870 retires instructions using retirement logic 1875. In some embodiments, the processor unit 1800 allows out of order execution but requires in-order retirement of instructions. Retirement logic 1875 can take a variety of forms as known to those of skill in the art (e.g., re-order buffers or the like).

The processor unit 1800 is transformed during execution of instructions, at least in terms of the output generated by the decoder 1830, hardware registers and tables utilized by the register renaming logic 1835, and any registers (not shown) modified by the execution logic 1850. Although not illustrated in FIG. 18, a processor can include other elements on an integrated chip with the processor unit 1800. For example, a processor may include additional elements such as memory control logic, one or more graphics modules, I/O control logic and/or one or more caches.

As used in any embodiment herein, the term "module" refers to logic that may be implemented in a hardware component or device, software or firmware running on a processor, or a combination thereof, to perform one or more operations consistent with the present disclosure. Software may be embodied as a software package, code, instructions, instruction sets and/or data recorded on non-transitory computer-readable storage mediums. Firmware may be embodied as code, instructions or instruction sets and/or data that are hard-coded (e.g., nonvolatile) in memory devices. As used in any embodiment herein, the term "circuitry" can comprise, for example, singly or in any combination, hard-wired circuitry, programmable circuitry such as computer processors comprising one or more individual instruction processing cores, state machine circuitry, and/or firmware that stores instructions executed by programmable circuitry. Modules described herein may, collectively or individually, be embodied as circuitry that forms a part of one or more devices. Thus, any of the modules can be implemented as circuitry, such as continuous itemset generation circuitry, entropy-based discretization circuitry, etc. A computer device referred to as being programmed to perform a method can be programmed to perform the method via software, hardware, firmware or combinations thereof.

In some embodiments, a lid controller hub is a packaged integrated circuit comprising components (modules, ports, controllers, driver, timings, blocks, accelerators, processors, etc.) described herein as being a part of the lid controller hub. Lid controller hub components can be implemented as dedicated circuitry, programmable circuitry that operates firmware or software, or a combination thereof. Thus, modules can be alternately referred to as "circuitry" (e.g., "image preprocessing circuitry"). Modules can also be alternately referred to as "engines" (e.g., "security engine", "host engine", "vision/imaging engine," "audio engine") and an "engine" can be implemented as a combination of hardware, software, firmware or a combination thereof. Further, lid controller hub modules (e.g., audio module, vision/imaging module) can be combined with other modules and individual modules can be split into separate modules.

The use of reference numbers in the claims and the specification is meant as in aid in understanding the claims and the specification and is not meant to be limiting.

Any of the disclosed methods can be implemented as computer-executable instructions or a computer program product. Such instructions can cause a computer or one or more processors capable of executing computer-executable instructions to perform any of the disclosed methods. Generally, as used herein, the term "computer" refers to any computing device or system described or mentioned herein, or any other computing device. Thus, the term "computer-executable instruction" refers to instructions that can be executed by any computing device described or mentioned herein, or any other computing device.

The computer-executable instructions or computer program products as well as any data created and used during implementation of the disclosed technologies can be stored on one or more tangible or non-transitory computer-readable storage media, such as optical media discs (e.g., DVDs, CDs), volatile memory components (e.g., DRAM, SRAM), or non-volatile memory components (e.g., flash memory, solid state drives, chalcogenide-based phase-change non-volatile memories). Computer-readable storage media can be contained in computer-readable storage devices such as solid-state drives, USB flash drives, and memory modules. Alternatively, the computer-executable instructions may be performed by specific hardware components that contain hardwired logic for performing all or a portion of disclosed methods, or by any combination of computer-readable storage media and hardware components.

The computer-executable instructions can be part of, for example, a dedicated software application or a software application that is accessed via a web browser or other software application (such as a remote computing application). Such software can be read and executed by, for example, a single computing device or in a network environment using one or more networked computers. Further, it is to be understood that the disclosed technology is not limited to any specific computer language or program. For instance, the disclosed technologies can be implemented by software written in C++, Java, Perl, Python, JavaScript, Adobe Flash, or any other suitable programming language. Likewise, the disclosed technologies are not limited to any particular computer or type of hardware.

Furthermore, any of the software-based embodiments (comprising, for example, computer-executable instructions for causing a computer to perform any of the disclosed methods) can be uploaded, downloaded or remotely accessed through a suitable communication means. Such suitable communication means include, for example, the Internet, the World Wide Web, an intranet, cable (including fiber optic cable), magnetic communications, electromagnetic communications (including RF, microwave, and infrared communications), electronic communications, or other such communication means.

As used in this application and in the claims, a list of items joined by the term "and/or" can mean any combination of the listed items. For example, the phrase "A, B and/or C" can mean A; B; C; A and B; A and C; B and C; or A, B, and C. Further, as used in this application and in the claims, a list of items joined by the term "at least one of" can mean any combination of the listed terms. For example, the phrase "at least one of A, B, or C" can mean A; B; C; A and B; A and C; B and C; or A, B, and C. Moreover, as used in this application and in the claims, a list of items joined by the term "one or more of" can mean any combination of the listed terms. For example, the phrase "one or more of A, B and C" can mean A; B; C; A and B; A and C; B and C; or A, B, and C.

The disclosed methods, apparatuses and systems are not to be construed as limiting in any way. Instead, the present disclosure is directed toward all novel and nonobvious features and aspects of the various disclosed embodiments, alone and in various combinations and subcombinations with one another. The disclosed methods, apparatuses, and systems are not limited to any specific aspect or feature or combination thereof, nor do the disclosed embodiments require that any one or more specific advantages be present or problems be solved.

Although the operations of some of the disclosed methods are described in a particular, sequential order for convenient presentation, it is to be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Additional examples of the presently described display pixel data streaming techniques include the following, non-limiting implementations. Each of the following non-limiting examples may stand on its own or may be combined in any permutation or combination with any one or more of the other examples provided below or throughout the present disclosure.

Example 1 is an apparatus comprising: a housing; a camera sensor within the housing; a camera cover comprising a plurality of lenses, the camera cover moveably coupled to the housing to optically align a respective lens of the plurality of lenses with the camera sensor in different positions.

Example 2 includes the subject matter of Example 1, wherein the camera cover comprises a privacy portion to block light from entering the camera sensor when the privacy portion is optically aligned with the camera sensor.

Example 3 includes the subject matter of Example 1 or 2, wherein the camera cover is coupled to the housing to allow for a selection of one of multiple positions of the camera cover with respect to the camera sensor.

Example 4 includes the subject matter of Example 3, wherein each position of at least a subset of the multiple positions coincides with a respective lens of the camera cover being optically aligned with the camera sensor.

Example 5 includes the subject matter of Example 3 or 4, wherein each position of the multiple positions coincides with at least a portion of the camera cover being positioned over the camera sensor.

Example 6 includes the subject matter of Example 3 or 4, wherein at least one position of the multiple positions coincides with the camera cover being positioned away from the camera sensor (e.g., the camera cover not being over the camera sensor).

Example 7 includes the subject matter of any one of Examples 1-6, wherein the camera cover is within a cavity of an outer surface of the housing.

Example 8 includes the subject matter of any one of Examples 1-7, wherein the camera cover is magnetically coupled to the housing.

Example 9 includes the subject matter of Example 8, wherein the housing comprises a set of first magnets adjacent an outer surface of the housing and the camera cover comprises a set of second magnets of opposite polarity from the first magnets, the first magnets and second magnets arranged to align and attract with one another in a set of positions of the camera cover with respect to the camera sensor.

Example 10 includes the subject matter of Example 8, wherein the housing comprises a set of first multi-pole magnets adjacent an outer surface of the housing and the camera cover comprises a set of second multi-pole magnets opposite the first multi-pole magnets, the first multi-pole magnets and second multi-pole magnets arranged to align and attract with one another in a set of positions of the camera cover with respect to the camera sensor.

Example 11 includes the subject matter of Example 8, wherein housing comprises a set of first magnetic clutch bearings in cavities of the housing and the camera cover comprises a set of magnetic brakes, the magnetic brakes and clutch bearings arranged to align and attract with one another in a set of positions of the camera cover with respect to the camera sensor.

Example 12 includes the subject matter of any one of Examples 1-7, wherein the camera cover is coupled to the housing via a ratchet mechanism.

Example 13 includes the subject matter of any one of Examples 1-7, wherein the housing further comprises a motor mechanically coupled to the camera cover to move the camera cover to a set of positions with respect to the camera sensor.

Example 14 includes the subject matter of Example 13, further comprising logic circuitry to control the motor.

Example 15 includes the subject matter of any one of Examples 1-14, further comprising a lens coupled to the camera sensor within the housing.

Example 16 is a computing device comprising: a base comprising a processor and memory; a lid coupled to the base, comprising: a display; a user-facing camera system; a camera cover comprising a plurality of lenses, the camera cover moveably coupled to the lid to optically align a respective lens of the plurality of lenses with a camera sensor of the user-facing camera system in different positions.

Example 17 includes the subject matter of Example 16, wherein the camera cover comprises a privacy portion to block light from entering the camera sensor when the privacy portion is optically aligned with the camera sensor.

Example 18 includes the subject matter of Example 16 or 17, wherein the camera cover is coupled to the lid to allow for a selection of one of multiple positions of the camera cover with respect to the camera sensor.

Example 19 includes the subject matter of Example 18, wherein each position of at least a subset of the multiple positions coincides with a respective lens of the camera cover being optically aligned with the camera sensor.

Example 20 includes the subject matter of Example 18 or 19, wherein each position of the multiple positions coincides with at least a portion of the camera cover being positioned over the camera sensor.

Example 21 includes the subject matter of Example 18 or 19, wherein at least one position of the multiple positions coincides with the camera cover being positioned away from the camera sensor (e.g., the camera cover not being over the camera sensor).

Example 22 includes the subject matter of any one of Examples 16-21, wherein the camera cover is within a cavity of an outer surface of the lid.

Example 23 includes the subject matter of any one of Examples 16-22, wherein the camera cover is magnetically coupled to the lid.

Example 24 includes the subject matter of Example 23, wherein the lid comprises a set of first magnets adjacent an outer surface of the lid and the camera cover comprises a set of second magnets of opposite polarity from the first magnets, the first magnets and second magnets arranged to align and attract with one another in a set of positions of the camera cover with respect to the camera sensor.

Example 25 includes the subject matter of Example 23, wherein the lid comprises a set of first multi-pole magnets adjacent an outer surface of the lid and the camera cover comprises a set of second multi-pole magnets opposite the first multi-pole magnets, the first multi-pole magnets and second multi-pole magnets arranged to align and attract with one another in a set of positions of the camera cover with respect to the camera sensor.

Example 26 includes the subject matter of Example 23, wherein the lid comprises a set of first magnetic clutch bearings in cavities of the lid and the camera cover comprises a set of magnetic brakes, the magnetic brakes and clutch bearings arranged to align and attract with one another in a set of positions of the camera cover with respect to the camera sensor.

Example 27 includes the subject matter of any one of Examples 16-22, wherein the camera cover is coupled to the lid via a ratchet mechanism.

Example 28 includes the subject matter of any one of Examples 16-22, wherein the lid further comprises a motor mechanically coupled to the camera cover to move the camera cover to a set of positions with respect to the camera sensor.

Example 29 includes the subject matter of Example 28, further comprising logic circuitry to control the motor.

Example 30 includes the subject matter of any one of Examples 16-29, further comprising a lens coupled to the camera sensor within the lid.

Example 31 includes the subject matter of any one of Examples 16-30, wherein the computing device is a laptop computing device.

Example 32 is computing system comprising: a processor; memory; a display; a camera system coupled to the display; and a camera cover comprising a plurality of lenses, the camera cover moveably coupled to the display to optically align a respective lens of the plurality of lenses with a camera sensor of the camera system in each position of a set of positions.

Example 33 includes the subject matter of Example 32, wherein the camera cover comprises a privacy portion to block light from entering the camera sensor when the privacy portion is optically aligned with the camera sensor.

Example 34 includes the subject matter of Example 32 or 33, wherein the camera cover is coupled to the display to allow for a selection of one of multiple positions of the camera cover with respect to the camera sensor.

Example 35 includes the subject matter of Example 34, wherein each position of at least a subset of the multiple positions coincides with a respective lens of the camera cover being optically aligned with the camera sensor.

Example 36 includes the subject matter of Example 34 or 35, wherein each position of the multiple positions coincides with at least a portion of the camera cover being positioned over the camera sensor.

Example 37 includes the subject matter of Example 34 or 35, wherein at least one position of the multiple positions coincides with the camera cover being positioned away from the camera sensor (e.g., the camera cover not being over the camera sensor).

Example 38 includes the subject matter of any one of Examples 32-37, wherein the camera cover is within a cavity of an outer surface of the display.

Example 39 includes the subject matter of any one of Examples 32-38, wherein the camera cover is magnetically coupled to the display.

Example 40 includes the subject matter of Example 39, wherein the display comprises a set of first magnets adjacent an outer surface of the display and the camera cover comprises a set of second magnets of opposite polarity from the first magnets, the first magnets and second magnets arranged to align and attract with one another in a set of positions of the camera cover with respect to the camera sensor.

Example 41 includes the subject matter of Example 39, wherein the display comprises a set of first multi-pole magnets adjacent an outer surface of the display and the camera cover comprises a set of second multi-pole magnets opposite the first multi-pole magnets, the first multi-pole magnets and second multi-pole magnets arranged to align and attract with one another in a set of positions of the camera cover with respect to the camera sensor.

Example 42 includes the subject matter of Example 39, wherein the display comprises a set of first magnetic clutch bearings in cavities of the display and the camera cover comprises a set of magnetic brakes, the magnetic brakes and clutch bearings arranged to align and attract with one another in a set of positions of the camera cover with respect to the camera sensor.

Example 43 includes the subject matter of any one of Examples 32-38, wherein the camera cover is coupled to the display via a ratchet mechanism.

Example 44 includes the subject matter of any one of Examples 32-38, wherein the display further comprises a motor mechanically coupled to the camera cover to move the camera cover to a set of positions with respect to the camera sensor.

Example 45 includes the subject matter of Example 44, further comprising logic circuitry to control the motor.

Example 46 includes the subject matter of any one of Examples 32-45, further comprising a lens coupled to the camera sensor within the display.

Example 47 includes the subject matter of any preceding Example, wherein each lens of the plurality of lenses has at least one lens characteristic different from the other lenses of the plurality of lenses.

The invention claimed is:

1. An apparatus comprising:
a housing;
a camera sensor within the housing; and
a camera cover comprising a plurality of lenses, the camera cover moveably coupled to the housing to optically align a respective lens of the plurality of lenses with the camera sensor in different positions;
wherein the housing comprises a set of first magnetic clutch bearings in cavities of the housing and the camera cover comprises a set of magnetic brakes, the magnetic brakes and clutch bearings arranged to align and attract with one another in a set of positions of the camera cover with respect to the camera sensor.

2. The apparatus of claim 1, wherein the camera cover comprises a privacy portion to block light from entering the camera sensor when the privacy portion is optically aligned with the camera sensor.

3. The apparatus of claim 1, wherein each position of at least a subset of the set of positions coincides with a respective lens of the camera cover being optically aligned with the camera sensor.

4. The apparatus of claim 1, wherein each position of the set of positions coincides with at least a portion of the camera cover being positioned over the camera sensor.

5. The apparatus of claim 1, wherein at least one position of the set of positions coincides with the camera cover being positioned away from the camera sensor.

6. The apparatus of claim 1, wherein the camera cover is within a cavity of an outer surface of the housing.

7. The apparatus of claim 1, wherein the housing comprises a set of first magnets adjacent an outer surface of the housing and wherein the camera cover comprises a set of second magnets of opposite polarity from the first magnets, the first magnets and second magnets arranged to align and attract with one another in a set of positions of the camera cover with respect to the camera sensor.

8. The apparatus of claim 7, wherein the first magnets and the second magnets each comprise a plurality of portions with different magnetic polarity in a particular arrangement.

9. The apparatus of claim 1, wherein the housing further comprises a motor mechanically coupled to the camera cover to move the camera cover to a set of positions with respect to the camera sensor.

10. The apparatus of claim 9, further comprising logic circuitry to control the motor.

11. The apparatus of claim 1, further comprising a lens coupled to the camera sensor within the housing.

12. A computing device comprising:
a base comprising a processor and memory; and
a lid coupled to the base, the lid comprising:
a display;
a user-facing camera system; and
a camera cover comprising a plurality of lenses, each lens having at least one lens characteristic different from other lenses of the plurality of lenses, the camera cover moveably coupled to the lid to optically align a respective lens of the plurality of lenses with a camera sensor of the user-facing camera system in a set of positions;
wherein the lid comprises a set of magnetic clutch bearings and the camera cover comprises a set of magnetic brakes, the magnetic brakes and clutch bearings arranged to align and attract with one another in each position of the set of positions.

13. The computing device of claim 12, wherein each position of the set positions coincides with a respective lens of the camera cover being optically aligned with the camera sensor.

14. The computing device of claim 12, wherein the camera cover comprises a privacy portion to block light from entering the camera sensor when the privacy portion is optically aligned with the camera sensor.

15. A computing system comprising:
a processor;
memory;
a display;
a camera system coupled to the display; and
a camera cover comprising a plurality of lenses, the camera cover moveably coupled to the display to optically align a respective lens of the plurality of lenses with a camera sensor of the camera system in each position of a set of positions;
wherein the camera cover is coupled to the display via a set of magnetic brakes and magnetic clutch bearings, the magnetic brakes and clutch bearings arranged to align and attract with one another in each position of the set of positions.

16. The computing system of claim 15, wherein the camera cover comprises a privacy portion to block light from entering the camera sensor when the privacy portion is optically aligned with the camera sensor.

* * * * *